US012699697B2

(12) United States Patent
Surendran et al.

(10) Patent No.: US 12,699,697 B2
(45) Date of Patent: Aug. 4, 2026

(54) SYSTEM AND METHOD FOR PROVIDING MULTI-HUB DATASETS FOR USE WITH DATA ANALYTICS ENVIRONMENTS

(71) Applicant: ORACLE INTERNATIONAL CORPORATION, Redwood Shores, CA (US)

(72) Inventors: Venugopal Surendran, Santa Clara, CA (US); Pravin Janardanam, Dallas, TX (US); Andrew Schmitz, Minneapolis, MN (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/895,669

(22) Filed: Aug. 25, 2022

(65) Prior Publication Data

US 2023/0081212 A1 Mar. 16, 2023

Related U.S. Application Data

(60) Provisional application No. 63/237,965, filed on Aug. 27, 2021.

(51) Int. Cl.
*G06F 16/2453* (2019.01)
*G06F 16/2455* (2019.01)
*G06F 16/25* (2019.01)
*G06Q 10/0639* (2023.01)

(52) U.S. Cl.
CPC .... *G06F 16/24542* (2019.01); *G06F 16/2456* (2019.01); *G06F 16/254* (2019.01); *G06Q 10/06393* (2013.01)

(58) Field of Classification Search
None
See application file for complete search history.

(56) References Cited

U.S. PATENT DOCUMENTS

| | | | | |
|---|---|---|---|---|
| 7,856,416 | B2 * | 12/2010 | Hoffman | G06F 16/283 |
| | | | | 707/804 |
| 2003/0093407 | A1 * | 5/2003 | Cochrane | G06F 16/24539 |
| 2004/0215626 | A1 * | 10/2004 | Colossi | G06F 16/22 |
| 2012/0173478 | A1 * | 7/2012 | Jensen | G06F 16/283 |
| | | | | 707/602 |
| 2015/0088856 | A1 * | 3/2015 | Hunter | G06F 16/24544 |
| | | | | 707/718 |
| 2017/0147644 | A1 * | 5/2017 | Lee | G06F 16/00 |
| 2019/0220464 | A1 * | 7/2019 | Butani | G06F 16/283 |

OTHER PUBLICATIONS

Janardanam, Pravin, "Modeling Your Data with Self-Service Data Sets in Oracle Analytics", Oracle Analytics, May 24, 2021, 6 pages.

* cited by examiner

*Primary Examiner* — Yu Zhao
(74) *Attorney, Agent, or Firm* — TUCKER ELLIS LLP

(57) ABSTRACT

In accordance with an embodiment, described herein is a system and method for providing multi-hub and/or multi-table datasets with a computing environment such as, for example, a business intelligence environment, database, data warehouse, or other type of environment that supports data analytics. An analysis can be used to query data to provide information in the form of tables, graphs, pivot tables, or other data views. A hub table operates as fact table and carries the data metrics for analysis, enabling a user to join two tables, the data from which can be further transformed or enriched to prepare it for analysis.

19 Claims, 32 Drawing Sheets

QUERY 1 EXECUTION PLAN

```
Execution plan:

RqList <<165002>> [for database 0:0,0]
 D1.c1 as c1 [for database 0:0,0],
 D1.c2 as c2 [for database 0:0,0],
 D1.c3 as c3 [for database 0:0,0]
Child Nodes (RqJoinSpec): <<165013>> [for database 0:0,0]
 RqJoinNode <<165012>> []
 (
 RqBreakFilter <<165000>>[1] [for database 0:0,0]
 RqList <<161899>> [for database 0:0,0]
  coalesce( D901.c1 , D901.c2) as c1 GB [for database 0:0,0],
  D901.c3 as c2 GB [for database 0:0,0],
  D901.c4 as c3 GB [for database 0:0,0]
 Child Nodes (RqJoinSpec): <<165047>> [for database 0:0,0]
  RqJoinNode <<165078>> []
  (
  RqList <<165057>> [for database 0:0,0]
  D113.c1 as c1 GB [for database 0:0,0],
  D114.c1 as c2 GB [for database 0:0,0],
  D113.c2 as c3 GB [for database 0:0,0],
  D114.c2 as c4 GB [for database 0:0,0]
  Child Nodes (RqJoinSpec): <<165060>> [for database 0:0,0]
  RqJoinNode <<165056>> []
   (
  RqList <<163929>> [for database 0:0,0]
  D108.c1 as c1 [for database 0:0,0],
  sum(D108.c2 by [ D108.c1] ) as c2 [for database 0:0,0]
  Child Nodes (RqJoinSpec): <<164896>> [for database 0:0,0]
  RqJoinNode <<164895>> []
   (
  RqList <<165089>> [for database 0:0,0]
  D2.c2 as c1 [for database 0:0,0],
  D1.c2 as c2 [for database 0:0,0]
  Child Nodes (RqJoinSpec): <<165092>> [for database 0:0,0]
  RqJoinNode <<165088>> []
   (
   RqList <<164340>> [for database 0:0,118]
   T1000009.Customer_ID as c1 [for database 0:0,118],
   T1000009.SALES as c2 [for database 0:0,118]
   Child Nodes (RqJoinSpec): <<164350>> [for database 0:0,118]
   RqJoinNode <<164349>> []
   [users/administrator/dv_joins/multihub/input::##dataSales] as T1000009
   ) as D1 LeftOuterJoin (Eager) <<164309>> On D1.c1 = D2.c1;
     actual join vectors: [ 0 ] = [ 0 ]
   (
   RqList <<164369>> [for database 0:0,0]
   D110.c1 as c1 [for database 0:0,0],
   nullifnotunique(D110.c2 by [ D110.c1] ) as c2 [for database 0:0,0]
   Child Nodes (RqJoinSpec): <<164854>> [for database 0:0,0]
   RqJoinNode <<164853>> []
   (
    RqList <<164778>> [for database 0:0,118]
    T1000012.Customer_ID as c1 [for database 0:0,118],
    T1000012.Customer_City as c2 [for database 0:0,118]
```

*FIGURE 25A*

```
      Child Nodes (RqJoinSpec): <<164788>> [for database 0:0,118]
      RqJoinNode <<164787>> []
      [users/administrator/dv_joins/my_customers/input::data] as T1000012
     ) as D110
    GroupBy: [ D110.c1] [for database 0:0,0] sort
    OrderBy: c1, Aggs:[ nullifnotunique(D110.c2 by [ D110.c1] ) ] [for database 0:0,0]
    ) as D2
   ) as D108
  GroupBy: [ D108.c1] [for database 0:0,0] sort
  OrderBy: c1, Aggs:[ sum(D108.c2 by [ D108.c1] ) ] [for database 0:0,0]
  ) as D114 FullOuterJoin (Eager) <<164993>> On D113.c1 =NullsEqual D114.c1;
     actual join vectors: [ 0 ] = [ 0 ]
  (
 RqList <<162484>> [for database 0:0,0]
 D103.c1 as c1 [for database 0:0,0],
 sum(D103.c2 by [ D103.c1] ) as c2 [for database 0:0,0]
 Child Nodes (RqJoinSpec): <<163468>> [for database 0:0,0]
 RqJoinNode <<163467>> []
  (
 RqList <<165117>> [for database 0:0,0]
 D2.c2 as c1 [for database 0:0,0],
 D1.c2 as c2 [for database 0:0,0]
 Child Nodes (RqJoinSpec): <<165120>> [for database 0:0,0]
 RqJoinNode <<165116>> []
   (
  RqList <<162912>> [for database 0:0,118]
  T1000004.Customer_ID as c1 [for database 0:0,118],
  T1000004.TARGET as c2 [for database 0:0,118]
  Child Nodes (RqJoinSpec): <<162922>> [for database 0:0,118]
  RqJoinNode <<162921>> []
  [users/administrator/dv_joins/multihub/input::##dataTarget] as T1000004
  ) as D1 LeftOuterJoin (Eager) <<162879>> On D1.c1 = D2.c1;
     actual join vectors: [ 0 ] = [ 0 ]
   (
  RqList <<162941>> [for database 0:0,0]
  D105.c1 as c1 [for database 0:0,0],
  nullifnotunique(D105.c2 by [ D105.c1] ) as c2 [for database 0:0,0]
  Child Nodes (RqJoinSpec): <<163426>> [for database 0:0,0]
  RqJoinNode <<163425>> []
   (
   RqList <<163350>> [for database 0:0,118]
   T1000007.Customer_ID as c1 [for database 0:0,118],
   T1000007.Customer_City as c2 [for database 0:0,118]
   Child Nodes (RqJoinSpec): <<163360>> [for database 0:0,118]
   RqJoinNode <<163359>> []
   [users/administrator/dv_joins/my_customers/input::data] as T1000007
   ) as D105
  GroupBy: [ D105.c1] [for database 0:0,0] sort
  OrderBy: c1, Aggs:[ nullifnotunique(D105.c2 by [ D105.c1] ) ] [for database 0:0,0]
  ) as D2
  ) as D103
 GroupBy: [ D103.c1] [for database 0:0,0] sort
 OrderBy: c1, Aggs:[ sum(D103.c2 by [ D103.c1] ) ] [for database 0:0,0]
 ) as D113
 ) as D901
OrderBy: c1 asc [for database 0:0,0]
 ) as D1
```

*FIGURE 25B*

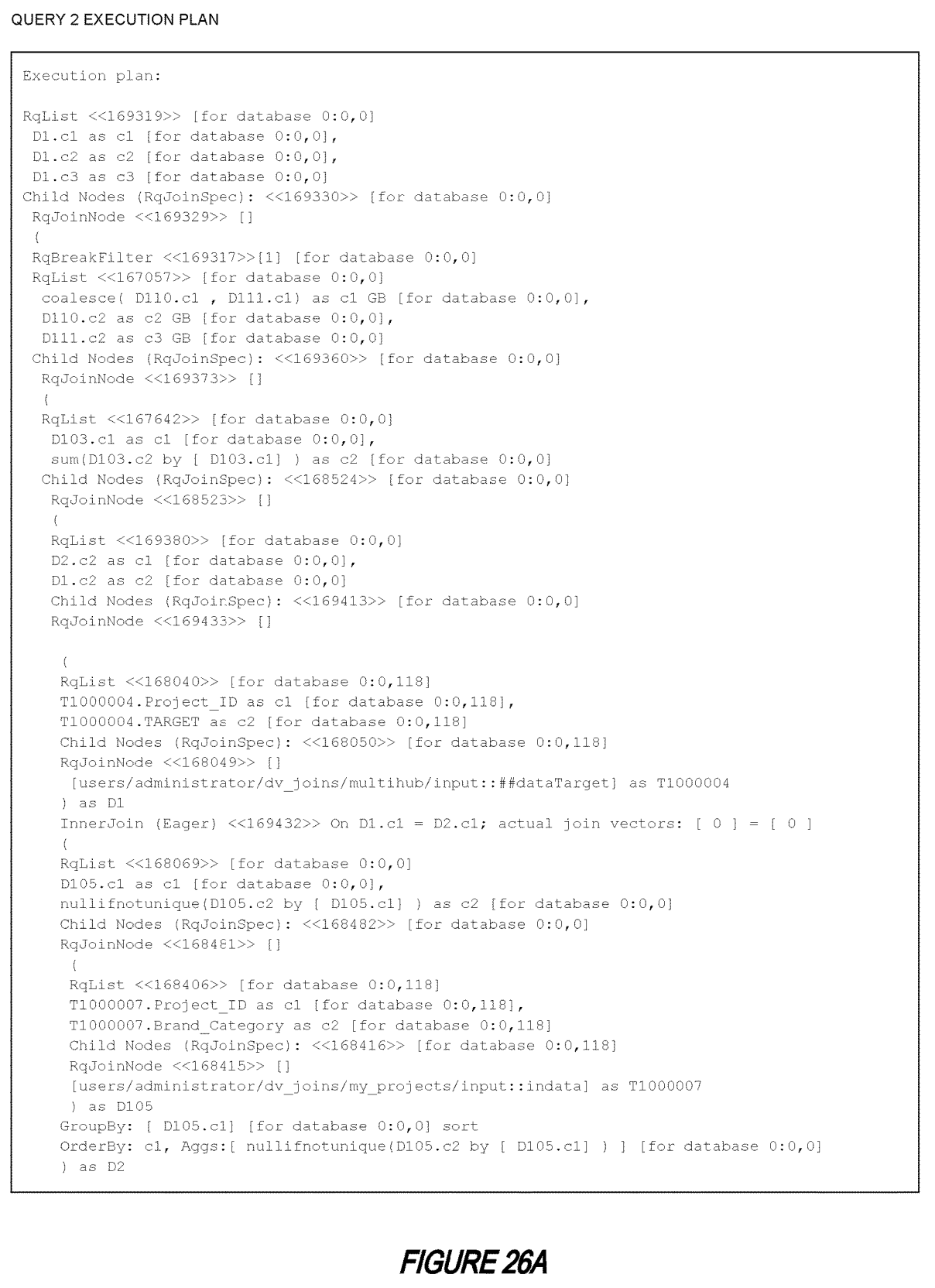

QUERY 2 EXECUTION PLAN

```
Execution plan:

RqList <<169319>> [for database 0:0,0]
 D1.c1 as c1 [for database 0:0,0],
 D1.c2 as c2 [for database 0:0,0],
 D1.c3 as c3 [for database 0:0,0]
Child Nodes (RqJoinSpec): <<169330>> [for database 0:0,0]
 RqJoinNode <<169329>> []
 (
 RqBreakFilter <<169317>>[1] [for database 0:0,0]
 RqList <<167057>> [for database 0:0,0]
  coalesce( D110.c1 , D111.c1) as c1 GB [for database 0:0,0],
  D110.c2 as c2 GB [for database 0:0,0],
  D111.c2 as c3 GB [for database 0:0,0]
 Child Nodes (RqJoinSpec): <<169360>> [for database 0:0,0]
  RqJoinNode <<169373>> []
   (
  RqList <<167642>> [for database 0:0,0]
   D103.c1 as c1 [for database 0:0,0],
   sum(D103.c2 by [ D103.c1] ) as c2 [for database 0:0,0]
  Child Nodes (RqJoinSpec): <<168524>> [for database 0:0,0]
   RqJoinNode <<168523>> []
   (
   RqList <<169380>> [for database 0:0,0]
   D2.c2 as c1 [for database 0:0,0],
   D1.c2 as c2 [for database 0:0,0]
   Child Nodes (RqJoinSpec): <<169413>> [for database 0:0,0]
   RqJoinNode <<169433>> []

(
   RqList <<168040>> [for database 0:0,118]
   T1000004.Project_ID as c1 [for database 0:0,118],
   T1000004.TARGET as c2 [for database 0:0,118]
   Child Nodes (RqJoinSpec): <<168050>> [for database 0:0,118]
   RqJoinNode <<168049>> []
    [users/administrator/dv_joins/multihub/input::##dataTarget] as T1000004
   } as D1
   InnerJoin (Eager) <<169432>> On D1.c1 = D2.c1; actual join vectors: [ 0 ] = [ 0 ]
   (
   RqList <<168069>> [for database 0:0,0]
   D105.c1 as c1 [for database 0:0,0],
   nullifnotunique(D105.c2 by [ D105.c1] ) as c2 [for database 0:0,0]
   Child Nodes (RqJoinSpec): <<168482>> [for database 0:0,0]
   RqJoinNode <<168481>> []
    (
    RqList <<168406>> [for database 0:0,118]
    T1000007.Project_ID as c1 [for database 0:0,118],
    T1000007.Brand_Category as c2 [for database 0:0,118]
    Child Nodes (RqJoinSpec): <<168416>> [for database 0:0,118]
    RqJoinNode <<168415>> []
    [users/administrator/dv_joins/my_projects/input::indata] as T1000007
    } as D105
   GroupBy: [ D105.c1] [for database 0:0,0] sort
   OrderBy: c1, Aggs:[ nullifnotunique(D105.c2 by [ D105.c1] ) ] [for database 0:0,0]
   } as D2
```

*FIGURE 26A*

```
 } as D103
GroupBy: [ D103.c1] [for database 0:0,0] sort
OrderBy: c1, Aggs:[ sum(D103.c2 by [ D103.c1] ) ] [for database 0:0,0]
} as D110
CrossProductJoin [for database 0:0,0]<<169372>>
(
RqList <<168985>> [for database 0:0,0]
 D108.c1 as c1 [for database 0:0,0],
 sum(D108.c2 by [ D108.c1] ) as c2 [for database 0:0,0]
Child Nodes (RqJoinSpec): <<169214>> [for database 0:0,0]
 RqJoinNode <<169213>> []
 (
 RqList <<169133>> [for database 0:0,0]
 cast(NULL as VARCHAR ( 40 )) as c1 [for database 0:0,1],
 D1.c1 as c2 [for database 0:0,0]
 Child Nodes (RqJoinSpec): <<169142>> [for database 0:0,0]
 RqJoinNode <<169132>> []
  (
  RqList <<169160>> [for database 0:0,118]
  T1000009.SALES as c1 [for database 0:0,118]
  Child Nodes (RqJoinSpec): <<169168>> [for database 0:0,118]
  RqJoinNode <<169167>> []
  [users/administrator/dv_joins/multihub/input::##dataSales] as T1000009
  } as D1
 } as D108
GroupBy: [ D108.c1] [for database 0:0,0] sort
OrderBy: c1, Aggs:[ sum(D108.c2 by [ D108.c1] ) ] [for database 0:0,0]
} as D111
OrderBy: c1 asc [for database 0:0,0]
} as D1
```

*FIGURE 26B*

QUERY 3 EXECUTION PLAN

```
Execution plan:

RqList <<184609>> [for database 0:0,0]
 D1.c1 as c1 [for database 0:0,0],
 D1.c2 as c2 [for database 0:0,0],
 D1.c3 as c3 [for database 0:0,0],
 D1.c4 as c4 [for database 0:0,0]
Child Nodes (RqJoinSpec): <<184622>> [for database 0:0,0]
 RqJoinNode <<184621>> []
 (
 RqBreakFilter <<184607>>[1,2] [for database 0:0,0]
 RqList <<180767>> [for database 0:0,0]
  coalesce( D901.c3 , D901.c4) as c2 GB [for database 0:0,0],
  coalesce( D901.c1 , D901.c2) as c1 GB [for database 0:0,0],
  D901.c5 as c3 GB [for database 0:0,0],
  D901.c6 as c4 GB [for database 0:0,0]
 Child Nodes (RqJoinSpec): <<184660>> [for database 0:0,0]
  RqJoinNode <<184699>> []
  (
  RqList <<184670>> [for database 0:0,0]
  D116.c1 as c1 GB [for database 0:0,0],
  D117.c1 as c2 GB [for database 0:0,0],
  D116.c2 as c3 GB [for database 0:0,0],
  D117.c2 as c4 GB [for database 0:0,0],
  D116.c3 as c5 GB [for database 0:0,0],
  D117.c3 as c6 GB [for database 0:0,0]
  Child Nodes (RqJoinSpec): <<184673>> [for database 0:0,0]
  RqJoinNode <<184669>> []
   (
  RqList <<183493>> [for database 0:0,0]
  D111.c1 as c1 [for database 0:0,0],
  D111.c2 as c2 [for database 0:0,0],
  sum(D111.c3 by [ D111.c1, D111.c2] ) as c3 [for database 0:0,0]
  Child Nodes (RqJoinSpec): <<184475>> [for database 0:0,0]
  RqJoinNode <<184474>> []
   (
  RqList <<183882>> [for database 0:0,0]
  D901.c1 as c1 [for database 0:0,0],
  cast(NULL as VARCHAR ( 40 )) as c2 [for database 0:0,1],
  D901.c2 as c3 [for database 0:0,0]
  Child Nodes (RqJoinSpec): <<184700>> [for database 0:0,0]
  RqJoinNode <<184727>> []
   (
   RqList <<184710>> [for database 0:0,0]
   D2.c2 as c1 [for database 0:0,0],
   D1.c2 as c2 [for database 0:0,0]
   Child Nodes (RqJoinSpec): <<184713>> [for database 0:0,0]
   RqJoinNode <<184709>> []
   (
   RqList <<183914>> [for database 0:0,118]
   T1000012.Customer_ID as c1 [for database 0:0,118],
   T1000012.SALES as c2 [for database 0:0,118]
   Child Nodes (RqJoinSpec): <<183924>> [for database 0:0,118]
   RqJoinNode <<183923>> []
   [users/administrator/dv_joins/multihub/input::##dataSales] as T1000012
```

*FIGURE 27A*

```
  ) as D1 LeftOuterJoin (Eager) <<183880>> On D1.c1 = D2.c1;
   actual join vectors: [ 0 ] = [ 0 ]
 (
  RqList <<183943>> [for database 0:0,0]
  D113.c1 as c1 [for database 0:0,0],
  nullifnotunique(D113.c2 by [ D113.c1] ) as c2 [for database 0:0,0]
  Child Nodes (RqJoinSpec): <<184428>> [for database 0:0,0]
  RqJoinNode <<184427>> []
   (
  RqList <<184352>> [for database 0:0,118]
   T1000015.Customer_ID as c1 [for database 0:0,118],
   T1000015.Customer_City as c2 [for database 0:0,118]
   Child Nodes (RqJoinSpec): <<184362>> [for database 0:0,118]
    RqJoinNode <<184361>> []
    [users/administrator/dv_joins/my_customers/input::data] as T1000015
   ) as D113
   GroupBy: [ D113.c1] [for database 0:0,0] sort
   OrderBy: c1, Aggs:[ nullifnotunique(D113.c2 by [ D113.c1] ) ] [for database 0:0,0]
  ) as D2
 ) as D901
 ) as D111
GroupBy: [ D111.c1, D111.c2] [for database 0:0,0] sort
OrderBy: c1, c2, Aggs:[ sum(D111.c3 by [ D111.c1, D111.c2] ) ] [for database 0:0,0]
) as D117 FullOuterJoin (Eager) <<184598>> On D116.c1 =NullsEqual D117.c1;
  actual join vectors: [ 0 ] = [ 0 ]
(
RqList <<181372>> [for database 0:0,0]
D103.c1 as c1 [for database 0:0,0],
D103.c2 as c2 [for database 0:0,0],
sum(D103.c3 by [ D103.c1, D103.c2] ) as c3 [for database 0:0,0]
Child Nodes (RqJoinSpec): <<183007>> [for database 0:0,0]
RqJoinNode <<183006>> []
 (
 RqList <<184760>> [for database 0:0,0]
 D901.c3 as c1 [for database 0:0,0],
 D3.c2 as c2 [for catabase 0:0,0],
 D901.c2 as c3 [for database 0:0,0]
 Child Nodes (RqJoinSpec): <<184763>> [for database 0:0,0]
 RqJoinNode <<184759>> []
  (
  RqList <<184738>> [for database 0:0,0]
  D1.c1 as c1 [for database 0:0,0],
  D1.c3 as c2 [for database 0:0,0],
  D2.c2 as c3 [for database 0:0,0]
  Child Nodes (RqJoinSpec): <<184741>> [for database 0:0,0]
  RqJoinNode <<184737>> []
   (
   RqList <<182016>> [for database 0:0,118]
   T1000004.Customer_ID as c2 [for database 0:0,118],
   T1000004.Project_ID as c1 [for database 0:0,118],
   T1000004.TARGET as c3 [for database 0:0,118]
   Child Nodes (RqJoinSpec): <<182028>> [for database 0:0,118]
   RqJoinNode <<182027>> []
   [users/administrator/dv_joins/multihub/input::##dataTarget] as T1000004
   ) as D1 LeftOuterJoin (Eager) <<181779>> On D1.c2 = D2.c1;
    actual join vectors: [ 0 ] = [ 0 ]
   (
```

*FIGURE 27B*

```
     RqList <<182050>> [for database 0:0,0]
     D105.c1 as c1 [for database 0:0,0],
     nullifnotunique(D105.c2 by [ D105.c1] ) as c2 [for database 0:0,0]
     Child Nodes (RqJoinSpec): <<182535>> [for database 0:0,0]
     RqJoinNode <<182534>> []
     (
      RqList <<182459>> [for database 0:0,118]
      T1000007.Customer_ID as c1 [for database 0:0,118],
      T1000007.Customer_City as c2 [for database 0:0,118]
      Child Nodes (RqJoinSpec): <<182469>> [for database 0:0,118]
      RqJoinNode <<182468>> []
      [users/administrator/dv_joins/my_customers/input::data] as T1000007
     ) as D105
     GroupBy: [ D105.c1] [for database 0:0,0] sort
     OrderBy: c1, Aggs:[ nullifnotunique(D105.c2 by [ D105.c1] ) ] [for database 0:0,0]
     ) as D2
    ) as D901
   InnerJoin (Eager) <<181978>> On D901.c1 = D3.c1; actual join vectors: [ 0 ] = [ 0 ]
    (
    RqList <<182541>> [for database 0:0,0]
    D108.c1 as c1 [for database 0:0,0],
    nullifnotunique(D108.c2 by [ D108.c1] ) as c2 [for database 0:0,0]
    Child Nodes (RqJoinSpec): <<182954>> [for database 0:0,0]
    RqJoinNode <<182953>> []
    (
     RqList <<182878>> [for database 0:0,118]
     T1000010.Project_ID as c1 [for database 0:0,118],
     T1000010.Brand_Category as c2 [for database 0:0,118]
     Child Nodes (RqJoinSpec): <<182888>> [for database 0:0,118]
     RqJoinNode <<182887>> []
     [users/administrator/dv_joins/my_projects/input::indata] as T1000010
    ) as D108
    GroupBy: [ D108.c1] [for database 0:0,0] sort
    OrderBy: c1, Aggs:[ nullifnotunique(D108.c2 by [ D108.c1] ) ] [for database 0:0,0]
    ) as D3
   ) as D103
  GroupBy: [ D103.c1, D103.c2] [for database 0:0,0] sort
  OrderBy: c1, c2, Aggs:[ sum(D103.c3 by [ D103.c1, D103.c2] ) ] [for database 0:0,0]
  ) as D116
 ) as D901
OrderBy: c2 asc NULLS FIRST, c1 asc [for database 0:0,0]
 ) as D1
```

*FIGURE 27C*

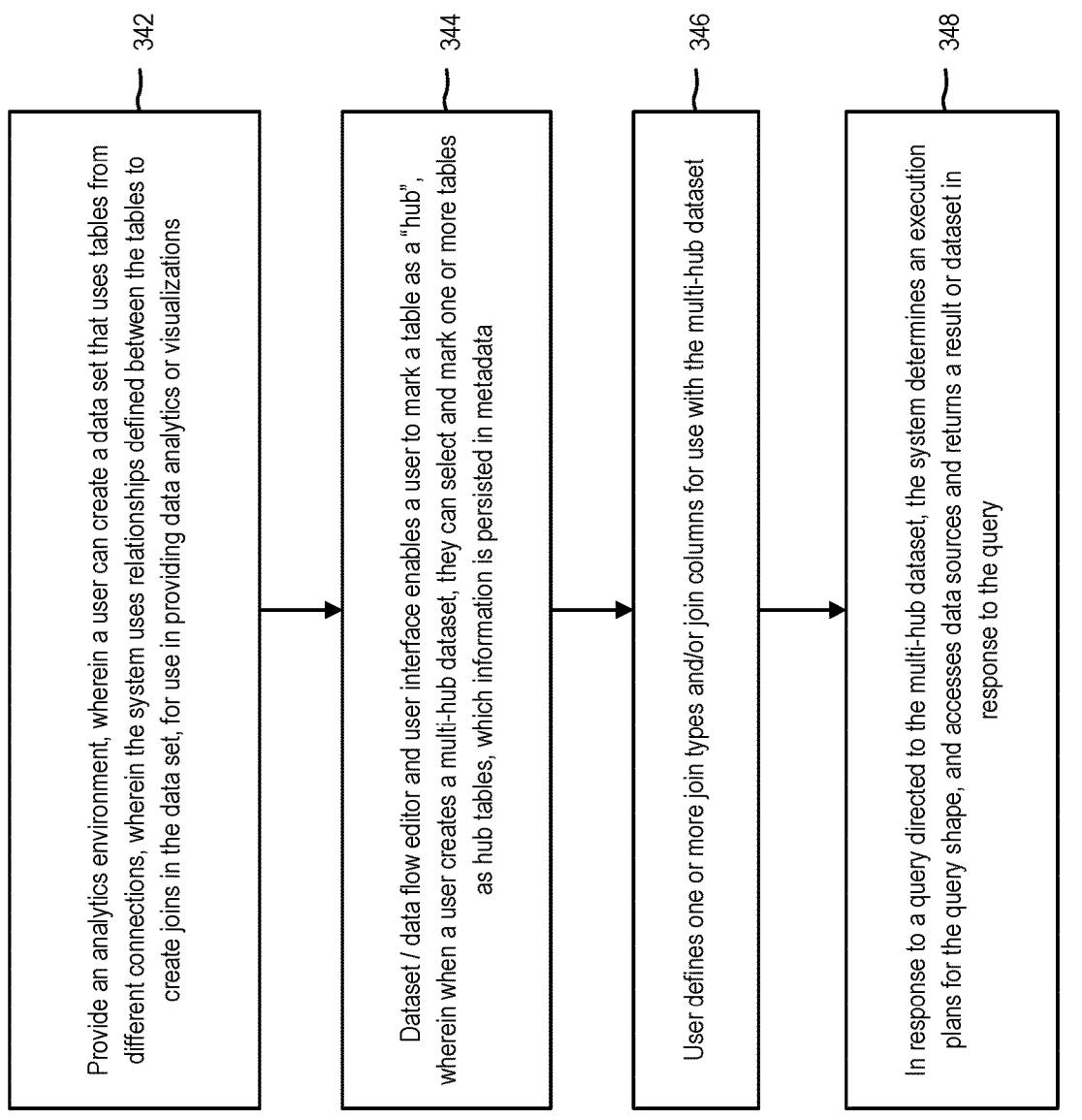

342

Provide an analytics environment, wherein a user can create a data set that uses tables from different connections, wherein the system uses relationships defined between the tables to create joins in the data set, for use in providing data analytics or visualizations

344

Dataset / data flow editor and user interface enables a user to mark a table as a "hub", wherein when a user creates a multi-hub dataset, they can select and mark one or more tables as hub tables, which information is persisted in metadata

346

User defines one or more join types and/or join columns for use with the multi-hub dataset

348

In response to a query directed to the multi-hub dataset, the system determines an execution plans for the query shape, and accesses data sources and returns a result or dataset in response to the query

*FIGURE 28*

SYSTEM AND METHOD FOR PROVIDING MULTI-HUB DATASETS FOR USE WITH DATA ANALYTICS ENVIRONMENTS

CLAIM OF PRIORITY

This application claims the benefit of priority to U.S. Provisional patent application titled "SYSTEM AND METHOD FOR PROVIDING MULTI-HUB DATASETS FOR USE WITH DATA ANALYTICS ENVIRON-MENTS", Application No. 63/237,965, filed Aug. 27, 2021; which application and its content thereof is herein incorporated by reference.

COPYRIGHT NOTICE

TECHNICAL FIELD

Embodiments described herein are generally related to computer data analytics, and computer-based methods of providing business intelligence or other data, and are particularly related to providing multi-hub and/or multi-table datasets for use with such environments.

BACKGROUND

Data analytics enables computer-based examination of large amounts of data, for example to derive conclusions or other information from the data. For example, business intelligence tools can be used to provide users with business intelligence describing their enterprise data, in a format that enables the users to make strategic business decisions.

SUMMARY

In accordance with an embodiment, described herein is a system and method for providing multi-hub and/or multi-table datasets with a computing environment such as, for example, a business intelligence environment, database, data warehouse, or other type of environment that supports data analytics. An analysis can be used to query data to provide information in the form of tables, graphs, pivot tables, or other data views. A hub table operates as fact table and carries the data metrics for analysis, enabling a user to join two tables, the data from which can be further transformed or enriched to prepare it for analysis.

BRIEF DESCRIPTION OF THE DRAWINGS

FIG. 25A illustrates example execution plans associated with a multi-hub-datasets, in accordance with an embodiment.

FIG. 25B illustrates example execution plans associated with a multi-hub-datasets, in accordance with an embodiment.

FIG. 26A illustrates example execution plans associated with a multi-hub-datasets, in accordance with an embodiment.

FIG. 26B illustrates example execution plans associated with a multi-hub-datasets, in accordance with an embodiment.

FIG. 27A illustrates example execution plans associated with a multi-hub-datasets, in accordance with an embodiment.

FIG. 27B illustrates example execution plans associated with a multi-hub-datasets, in accordance with an embodiment.

FIG. 27C illustrates example execution plans associated with a multi-hub-datasets, in accordance with an embodiment.

FIG. 28 illustrates a method for the of use multi-hub-datasets, in accordance with an embodiment.

DETAILED DESCRIPTION

Figure 1:
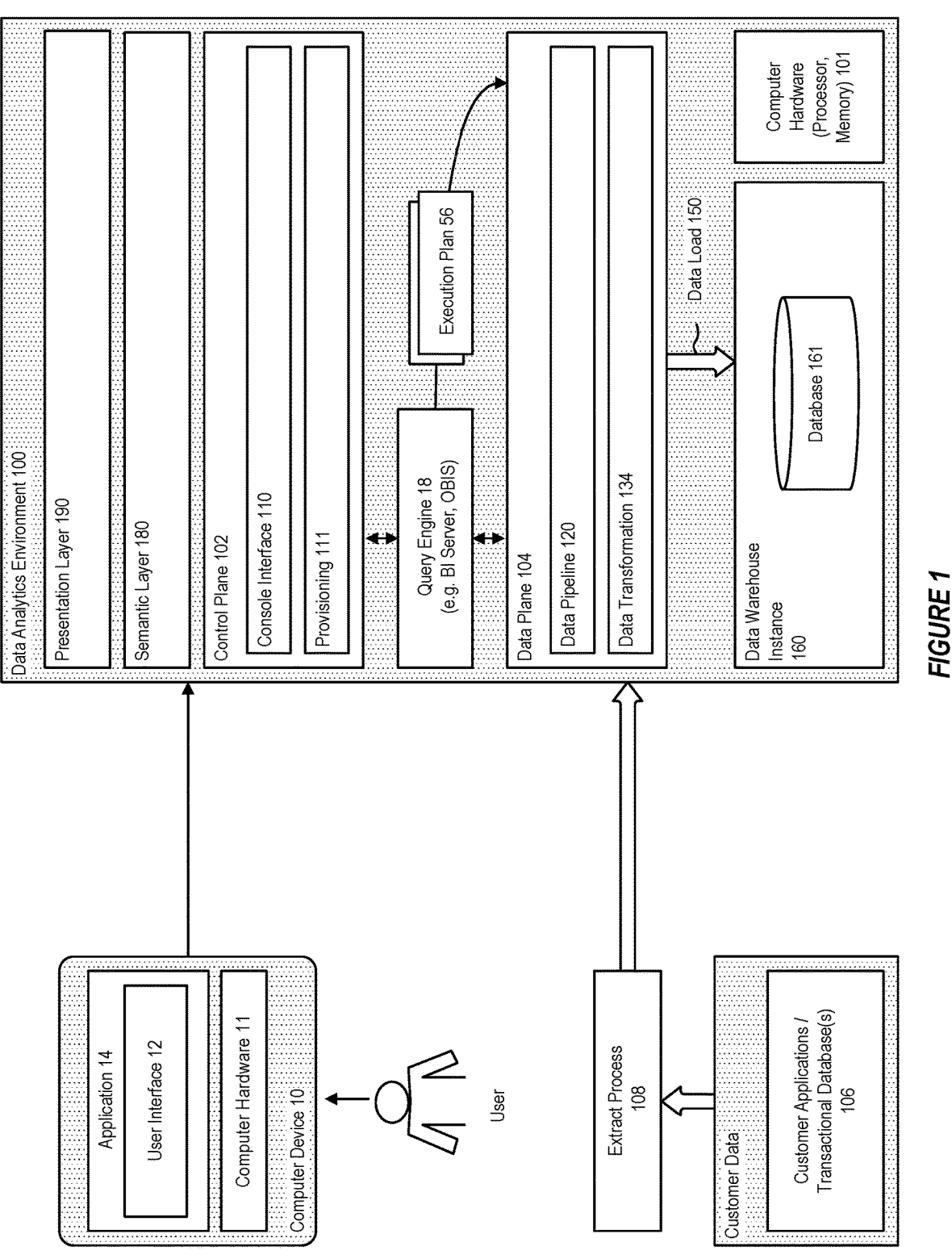
FIG. 1 illustrates an example data analytics environment, in accordance with an embodiment.

Generally described, within an organization, data analytics enables computer-based examination of large amounts of data, for example to derive conclusions or other information from the data. For example, business intelligence (BI) tools can be used to provide users with business intelligence describing their enterprise data, in a format that enables the users to make strategic business decisions.

Examples of such business intelligence tools/servers include Oracle Business Intelligence Applications (OBIA), Oracle Business Intelligence Enterprise Edition (OBIEE), or Oracle Business Intelligence Server (OBIS), which provide a query, reporting, and analysis server that can operate with a database to support features such as data mining or analytics, and analytic applications.

Increasingly, data analytics can be provided within the context of enterprise software application environments, such as, for example, an Oracle Fusion Applications environment; or within the context of software-as-a-service (SaaS) or cloud environments, such as, for example, an Oracle Analytics Cloud or Oracle Cloud Infrastructure environment; or other types of analytics application or cloud environments.

Introduction

In accordance with an embodiment, a data warehouse environment or component, such as, for example, an Oracle Autonomous Data Warehouse (ADW), Oracle Autonomous Data Warehouse Cloud (ADWC), or other type of data warehouse environment or component adapted to store large amounts of data, can provide a central repository for storage of data collected by one or more business applications.

For example, in accordance with an embodiment, the data warehouse environment or component can be provided as a multi-dimensional database that employs online analytical processing (OLAP) or other techniques to generate business-related data from multiple different sources of data. An organization can extract such business-related data from one or more vertical and/or horizontal business applications, and inject the extracted data into a data warehouse instance that is associated with that organization, Examples of horizontal business applications can include ERP, HCM, CX, SCM, and EPM, as described above, and provide a broad scope of functionality across various enterprise organizations.

Vertical business applications are generally narrower in scope that horizontal business applications, but provide access to data that is further up or down a chain of data within a defined scope or industry. Examples of vertical business applications can include medical software, or banking software, for use within a particular organization.

Although software vendors increasingly offer enterprise software products or components as SaaS or cloud-oriented offerings, such as, for example, Oracle Fusion Applications; while other enterprise software products or components, such as, for example, Oracle ADWC, can be offered as one or more of SaaS, platform-as-a-service (PaaS), or hybrid subscriptions; enterprise users of conventional business intelligence applications and processes generally face the task of extracting data from their horizontal and vertical business applications, and introducing the extracted data into a data warehouse—a process which can be both time and resource intensive.

In accordance with an embodiment, the analytic applications environment allows customers (tenants) to develop computer-executable software analytic applications for use with a BI component, such as, for example, an OBIS environment, or other type of BI component adapted to examine large amounts of data sourced either by the customer (tenant) itself, or from multiple third-party entities.

As another example, in accordance with an embodiment, the analytic applications environment can be used to pre-populate a reporting interface of a data warehouse instance with relevant metadata describing business-related data objects in the context of various business productivity software applications, for example, to include predefined dashboards, key performance indicators (KPIs), or other types of reports.

Data Analytics

Generally described, data analytics enables the computer-based examination or analysis of large amounts of data, in order to derive conclusions or other information from that data; while business intelligence tools (BI) provide an organization's business users with information describing their enterprise data in a format that enables those business users to make strategic business decisions.

Examples of data analytics environments and business intelligence tools/servers include Oracle Business Intelligence Server (OBIS), Oracle Analytics Cloud (OAC), and Fusion Analytics Warehouse (FAW), which support features such as data mining or analytics, and analytic applications.

FIG. 1 illustrates an example data analytics environment, in accordance with an embodiment.

The example embodiment illustrated in FIG. 1 is provided for purposes of illustrating an example of a data analytics environment in association with which various embodiments described herein can be used. In accordance with other embodiments and examples, the approach described herein can be used with other types of data analytics, database, or data warehouse environments. The components and processes illustrated in FIG. 1, and as further described herein with regard to various other embodiments, can be provided as software or program code executable by, for example, a cloud computing system, or other suitably-programmed computer system.

As illustrated in FIG. 1, in accordance with an embodiment, a data analytics environment 100 can be provided by, or otherwise operate at, a computer system having a computer hardware (e.g., processor, memory) 101, and including one or more software components operating as a control plane 102, and a data plane 104, and providing access to a data warehouse, data warehouse instance 160 (database 161, or other type of data source).

In accordance with an embodiment, the control plane operates to provide control for cloud or other software products offered within the context of a SaaS or cloud environment, such as, for example, an Oracle Analytics Cloud environment, or other type of cloud environment. For example, in accordance with an embodiment, the control plane can include a console interface 110 that enables access by a customer (tenant) and/or a cloud environment having a provisioning component 111.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants). For example, in accordance with an embodiment, the console interface can provide interfaces that allow customers to provision services for use within their SaaS environment, and to configure those services that have been provisioned.

In accordance with an embodiment, a customer (tenant) can request the provisioning of a customer schema within the data warehouse. The customer can also supply, via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer.

In accordance with an embodiment, the provisioning component can also be used to update or edit a data warehouse instance, and/or an ETL process that operates at the data plane, for example, by altering or updating a requested frequency of ETL process runs, for a particular customer (tenant).

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionality that extracts transactional data from business applications and databases that are provisioned in the SaaS environment, and then load a transformed data into the data warehouse.

In accordance with an embodiment, the data transformation layer can include a data model, such as, for example, a knowledge model (KM), or other type of data model, that the system uses to transform the transactional data received from business applications and corresponding transactional databases provisioned in the SaaS environment, into a model format understood by the data analytics environment. The model format can be provided in any data format suited for storage in a data warehouse. In accordance with an embodiment, the data plane can also include a data and configuration user interface, and mapping and configuration database.

In accordance with an embodiment, the data plane is responsible for performing extract, transform, and load (ETL) operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the data analytics schema, which can be updated by a data pipeline or process, for example, an ETL process, on a periodic or other basis.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction the data pipeline or process can insert extracted data into a data staging area, which can act as a temporary staging area for the extracted data. The data quality component and data protection component can be used to ensure the integrity of the extracted data. For example, in accordance with an embodiment, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

In accordance with an embodiment, the data pipeline or process can operate in combination with the data transformation layer to transform data into the model format. The mapping and configuration database can store metadata and data mappings that define the data model used by data transformation. The data and configuration user interface (UI) can facilitate access and changes to the mapping and configuration database.

In accordance with an embodiment, the data transformation layer can transform extracted data into a format suitable for loading into a customer schema of data warehouse, for example according to the data model. During the transformation, the data transformation can perform dimension generation, fact generation, and aggregate generation, as appropriate. Dimension generation can include generating dimensions or fields for loading into the data warehouse instance.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

Different customers of a data analytics environment may have different requirements with regard to how their data is classified, aggregated, or transformed, for purposes of providing data analytics or business intelligence data, or developing software analytic applications. In accordance with an embodiment, to support such different requirements, a semantic layer 180 can include data defining a semantic model of a customer's data; which is useful in assisting users in understanding and accessing that data using commonly-understood business terms; and provide custom content to a presentation layer 190.

In accordance with an embodiment, a semantic model can be defined, for example, in an Oracle environment, as a BI Repository (RPD) file, having metadata that defines logical schemas, physical schemas, physical-to-logical mappings, aggregate table navigation, and/or other constructs that implement the various physical layer, business model and mapping layer, and presentation layer aspects of the semantic model.

In accordance with an embodiment, a customer may perform modifications to their data source model, to support their particular requirements, for example by adding custom facts or dimensions associated with the data stored in their data warehouse instance; and the system can extend the semantic model accordingly.

In accordance with an embodiment, the presentation layer can enable access to the data content using, for example, a software analytic application, user interface, dashboard, key performance indicators (KPI's); or other type of report or interface as may be provided by products such as, for example, Oracle Analytics Cloud, or Oracle Analytics for Applications.

Business Intelligence Server

In accordance with an embodiment, a query engine 18 (e.g., an OBIS instance) operates in the manner of a federated query engine to serve analytical queries or requests from clients within, e.g., an Oracle Analytics Cloud environment, directed to data stored at a database.

In accordance with an embodiment, the OBIS instance can push down operations to supported databases, in accordance with a query execution plan 56, wherein a logical query can include Structured Query Language (SQL) statements received from the clients; while a physical query includes database-specific statements that the query engine sends to the database to retrieve data when processing the logical query. In this way the OBIS instance translates business user queries into appropriate database-specific query languages (e.g., Oracle SQL, SQL Server SQL, DB2 SQL, or Essbase MDX). The query engine (e.g., OBIS) can also support internal execution of SQL operators that cannot be pushed down to the databases.

In accordance with an embodiment, a user/developer can interact with a client computer device 10 that includes a computer hardware 11 (e.g., processor, storage, memory), user interface 12, and application 14. A query engine or business intelligence server such as OBIS generally operates to process inbound, e.g., SQL, requests against a database model, build and execute one or more physical database queries, process the data appropriately, and then return the data in response to the request.

To accomplish this, in accordance with an embodiment, the query engine or business intelligence server can include various components or features, such as a logical or business model or metadata that describes the data available as subject areas for queries; a request generator that takes incoming queries and turns them into physical queries for use with a connected data source; and a navigator that takes the incoming query, navigates the logical model and generates those physical queries that best return the data required for a particular query.

For example, in accordance with an embodiment, a query engine or business intelligence server may employ a logical model mapped to data in a data warehouse, by creating a simplified star schema business model over various data sources so that the user can query data as if it originated at a single source. The information can then be returned to the presentation layer as subject areas, according to business model layer mapping rules.

In accordance with an embodiment, the query engine (e.g., OBIS) can process queries against a database according to a query execution plan, that can include various child (leaf) nodes, generally referred to herein in various embodiments as RqLists, for example:

```
Execution plan:
[[
RqList <<191986>> [for database 0:0,0]
    D102.c1 as c1 [for database 0:0,0],
    sum(D102.c2 by [ D102.c1] ) as c2 [for database 0:0,0]
Child Nodes (RqJoinSpec): <<192970>> [for database 0:0,0]
    RqJoinNode <<192969>> [ ]
        (
        RqList <<193062>> [for database 0:0,0]
            D2.c2 as c1 [for database 0:0,0],
            D1.c2 as c2 [for database 0:0,0]
        Child Nodes (RqJoinSpec): <<193065>> [for database 0:0,0]
            RqJoinNode <<193061>> [ ]
                (
                RqList <<192414>> [for database 0:0,118]
                    T1000003.Customer__ID as c1 [for database 0:0,118],
                    T1000003.TARGET as c2 [for database 0:0,118]
                Child Nodes (RqJoinSpec): <<192424>> [for database 0:0,118]
                    RqJoinNode <<192423>> [ ]
                        [users/administrator/dv__joins/multihub/input::##dataTarget]
                            as T1000003
                ) as D1 LeftOuterJoin (Eager) <<192381>> On D1.c1 = D2.c1;
                actual join vectors: [ 0 ] = [ 0 ]
                (
                RqList <<192443>> [for database 0:0,0]
                    D104.c1 as c1 [for database 0:0,0],
                    nullifnotunique(D104.c2 by [ D104.c1] ) as c2 [for database 0:0,0]
                Child Nodes (RqJoinSpec): <<192928>> [for database 0:0,0]
                    RqJoinNode <<192927>> [ ]
                        (
                        RqList <<192852>> [for database 0:0,118]
                            T1000006.Customer__ID as c1 [for database 0:0,118],
                            T1000006.Customer__City as c2 [for database 0:0,118]
                        Child Nodes (RqJoinSpec): <<192862>> [for database 0:0,118]
                            RqJoinNode <<192861>> [ ]
                                [users/administrator/dv__joins/my__customers/input::data]
                                    as T1000006
                        ) as D104
                GroupBy: [ D104.c1] [for database 0:0,0] sort
                OrderBy: c1, Aggs:[ nullifnotunique(D104.c2 by [ D104.c1] ) ]
                    [for database 0:0,0]
                ) as D2
```

-continued

```
  ) as D102
GroupBy: [ D102.c1] [for database 0:0,0] sort
OrderBy: c1 asc, Aggs:[ sum(D102.c2 by [ D102.c1] ) ] [for database 0:0,0]
```

Within a query execution plan, each execution plan component (RqList) represents a block of query in the query execution plan, and generally translates to a SELECT statement. An RqList may have nested child RqLists, similar to how a SELECT statement can select from nested SELECT statements.

In accordance with an embodiment, a query engine can talk to different databases, and for each of these use datasource-specific code generators. A typical strategy is to ship as much SQL execution to the database, by sending it as part of the physical query—this reduces the amount of information being returned to the OBIS server.

In accordance with an embodiment, during operation the query engine or business intelligence server can create a query execution plan which can then be further optimized, for example to perform aggregations of data necessary to respond to a request. Data can be combined together and further calculations applied, before the results are returned to the calling application, for example via the ODBC interface.

In accordance with an embodiment, a complex, multi-pass request that requires multiple data sources may require the query engine or business intelligence server to break the query down, determine which sources, multi-pass calculations, and aggregates can be used, and generate the logical query execution plan spanning multiple databases and physical SQL statements, wherein the results can then be passed back, and further joined or aggregated by the query engine or business intelligence server.

Figure 2:
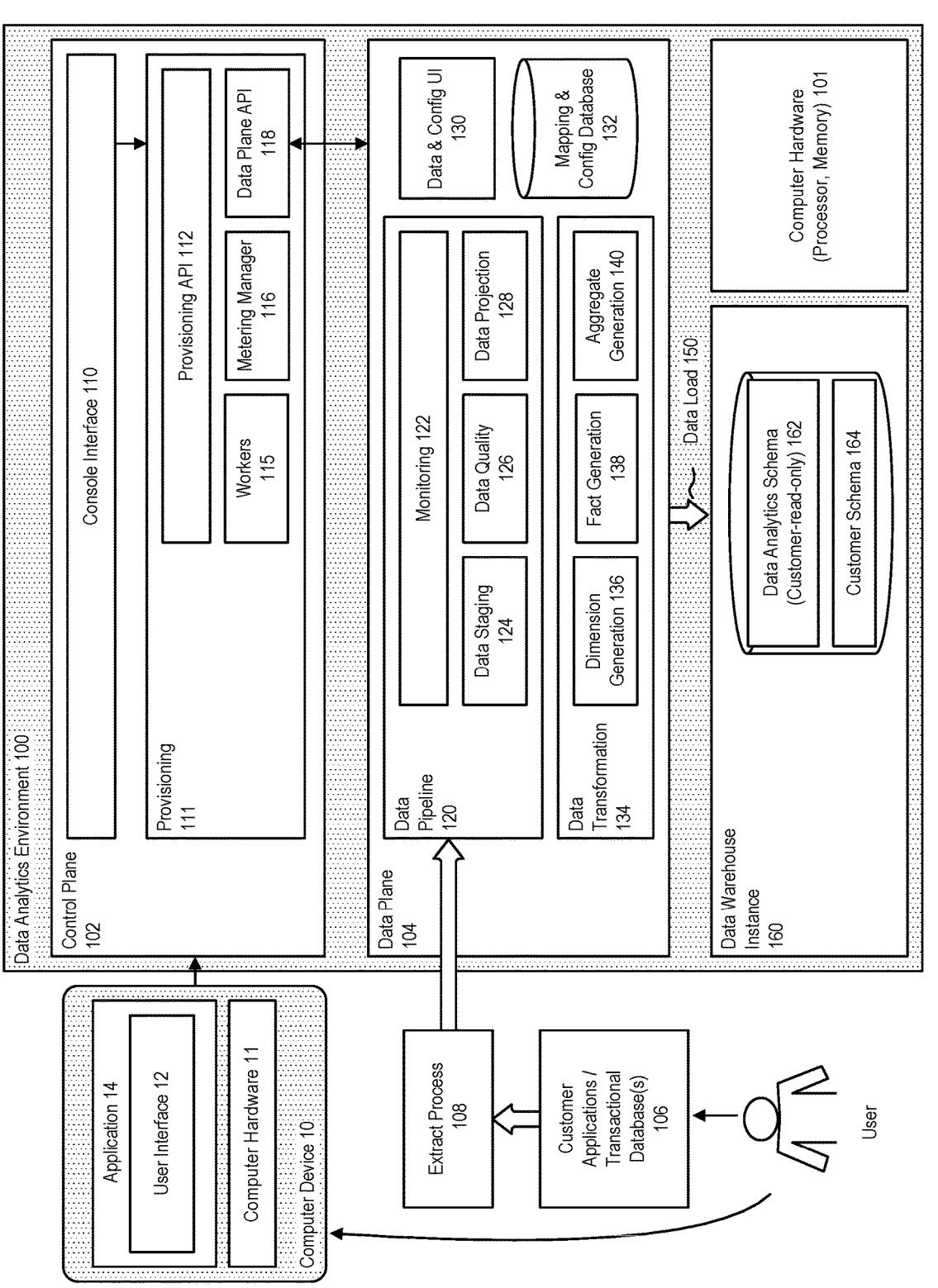
FIG. 2 further illustrates an example data analytics environment, in accordance with an embodiment.

FIG. 2 further illustrates an example data analytics environment, in accordance with an embodiment.

As illustrated in FIG. 2, in accordance with an embodiment, the provisioning component can also comprise a provisioning application programming interface (API) 112, a number of workers 115, a metering manager 116, and a data plane API 118, as further described below. The console interface can communicate, for example, by making API calls, with the provisioning API when commands, instructions, or other inputs are received at the console interface to provision services within the SaaS environment, or to make configuration changes to provisioned services.

In accordance with an embodiment, the data plane API can communicate with the data plane. For example, in accordance with an embodiment, provisioning and configuration changes directed to services provided by the data plane can be communicated to the data plane via the data plane API.

In accordance with an embodiment, the metering manager can include various functionality that meters services and usage of services provisioned through control plane. For example, in accordance with an embodiment, the metering manager can record a usage over time of processors provisioned via the control plane, for particular customers (tenants), for billing purposes. Likewise, the metering manager can record an amount of storage space of data warehouse partitioned for use by a customer of the SaaS environment, for billing purposes.

In accordance with an embodiment, the data pipeline or process, provided by the data plane, can including a monitoring component 122, a data staging component 124, a data quality component 126, and a data projection component 128, as further described below.

In accordance with an embodiment, the data transformation layer can include a dimension generation component 136, fact generation component 138, and aggregate generation component 140, as further described below. The data plane can also include a data and configuration user interface 130, and mapping and configuration database 132.

In accordance with an embodiment, the data warehouse can include a default data analytics schema (referred to herein in accordance with some embodiments as an analytic warehouse schema) 162 and, for each customer (tenant) of the system, a customer schema 164.

In accordance with an embodiment, to support multiple tenants, the system can enable the use of multiple data warehouses or data warehouse instances. For example, in accordance with an embodiment, a first warehouse customer tenancy for a first tenant can comprise a first database instance, a first staging area, and a first data warehouse instance of a plurality of data warehouses or data warehouse instances; while a second customer tenancy for a second tenant can comprise a second database instance, a second staging area, and a second data warehouse instance of the plurality of data warehouses or data warehouse instances.

In accordance with an embodiment, based on the data model defined in the mapping and configuration database, the monitoring component can determine dependencies of several different datasets (data sets) to be transformed. Based on the determined dependencies, the monitoring component can determine which of several different datasets should be transformed to the model format first.

For example, in accordance with an embodiment, if a first model dataset includes no dependencies on any other model dataset; and a second model dataset includes dependencies to the first model dataset; then the monitoring component can determine to transform the first dataset before the second dataset, to accommodate the second dataset's dependencies on the first dataset.

For example, in accordance with an embodiment, dimensions can include categories of data such as, for example, "name," "address," or "age". Fact generation includes the generation of values that data can take, or "measures." Facts can be associated with appropriate dimensions in the data warehouse instance. Aggregate generation includes creation of data mappings which compute aggregations of the transformed data to existing data in the customer schema of data warehouse instance.

In accordance with an embodiment, once any transformations are in place (as defined by the data model), the data pipeline or process can read the source data, apply the transformation, and then push the data to the data warehouse instance.

In accordance with an embodiment, data transformations can be expressed in rules, and once the transformations take place, values can be held intermediately at the staging area, where the data quality component and data projection components can verify and check the integrity of the transformed data, prior to the data being uploaded to the customer schema at the data warehouse instance. Monitoring can be provided as the extract, transform, load process runs, for example, at a number of compute instances or virtual machines. Dependencies can also be maintained during the extract, transform, load process, and the data pipeline or process can attend to such ordering decisions.

In accordance with an embodiment, after transformation of the extracted data, the data pipeline or process can execute a warehouse load procedure, to load the transformed data into the customer schema of the data warehouse instance. Subsequent to the loading of the transformed data into customer schema, the transformed data can be analyzed and used in a variety of additional business intelligence processes.

Figure 3:
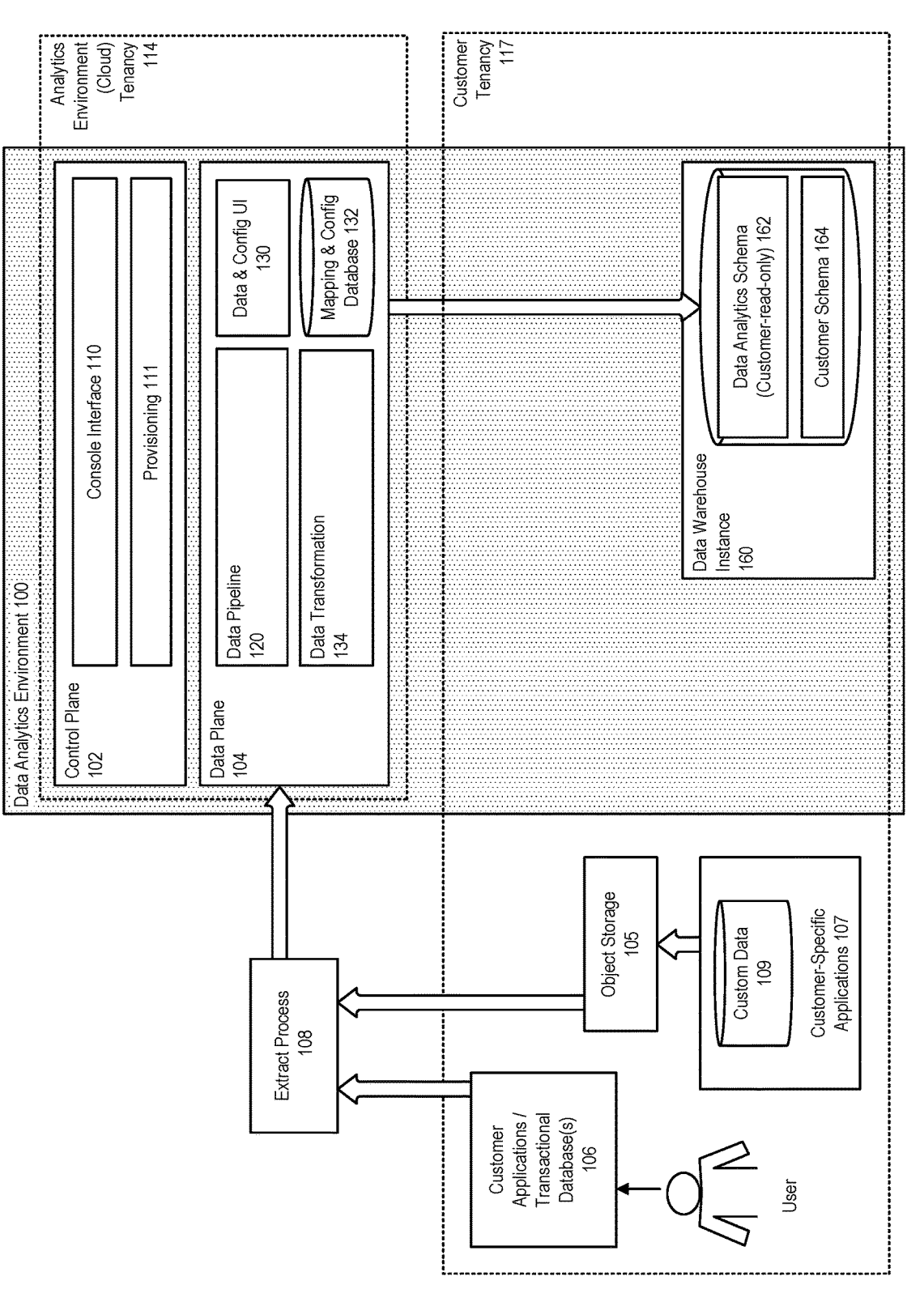
FIG. 3 further illustrates an example data analytics environment, in accordance with an embodiment.

FIG. 3 further illustrates an example data analytics environment, in accordance with an embodiment.

As illustrated in FIG. 3, in accordance with an embodiment, data can be sourced, e.g., from a customer's (tenant's) enterprise software application or data environment (106), using the data pipeline process; or as custom data 109 sourced from one or more customer-specific applications 107; and loaded to a data warehouse instance, including in some examples the use of an object storage 105 for storage of the data.

In accordance with embodiments of analytics environments such as, for example, Oracle Analytics Cloud (OAC), a user can create a dataset that uses tables from different connections and schemas. The system uses the relationships defined between these tables to create relationships or joins in the dataset.

In accordance with an embodiment, for each customer (tenant), the system uses the data analytics schema that is maintained and updated by the system, within a system/ cloud tenancy 114, to pre-populate a data warehouse instance for the customer, based on an analysis of the data within that customer's enterprise applications environment, and within a customer tenancy 117. As such, the data analytics schema maintained by the system enables data to be retrieved, by the data pipeline or process, from the customer's environment, and loaded to the customer's data warehouse instance.

In accordance with an embodiment, the system also provides, for each customer of the environment, a customer schema that is readily modifiable by the customer, and which allows the customer to supplement and utilize the data within their own data warehouse instance. For each customer, their resultant data warehouse instance operates as a database whose contents are partly-controlled by the customer; and partly-controlled by the environment (system).

For example, in accordance with an embodiment, a data warehouse (e.g., ADW) can include a data analytics schema and, for each customer/tenant, a customer schema sourced from their enterprise software application or data environment. The data provisioned in a data warehouse tenancy (e.g., an ADW cloud tenancy) is accessible only to that tenant; while at the same time allowing access to various, e.g., ETL-related or other features of the shared environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

In accordance with an embodiment, for a particular customer/tenant, upon extraction of their data, the data pipeline or process can insert the extracted data into a data staging area for the tenant, which can act as a temporary staging area for the extracted data. A data quality component and data protection component can be used to ensure the integrity of the extracted data; for example by performing validations on the extracted data while the data is temporarily held in the data staging area. When the extract process has completed its extraction, the data transformation layer can be used to begin the transformation process, to transform the extracted data into a model format to be loaded into the customer schema of the data warehouse.

Figure 4:
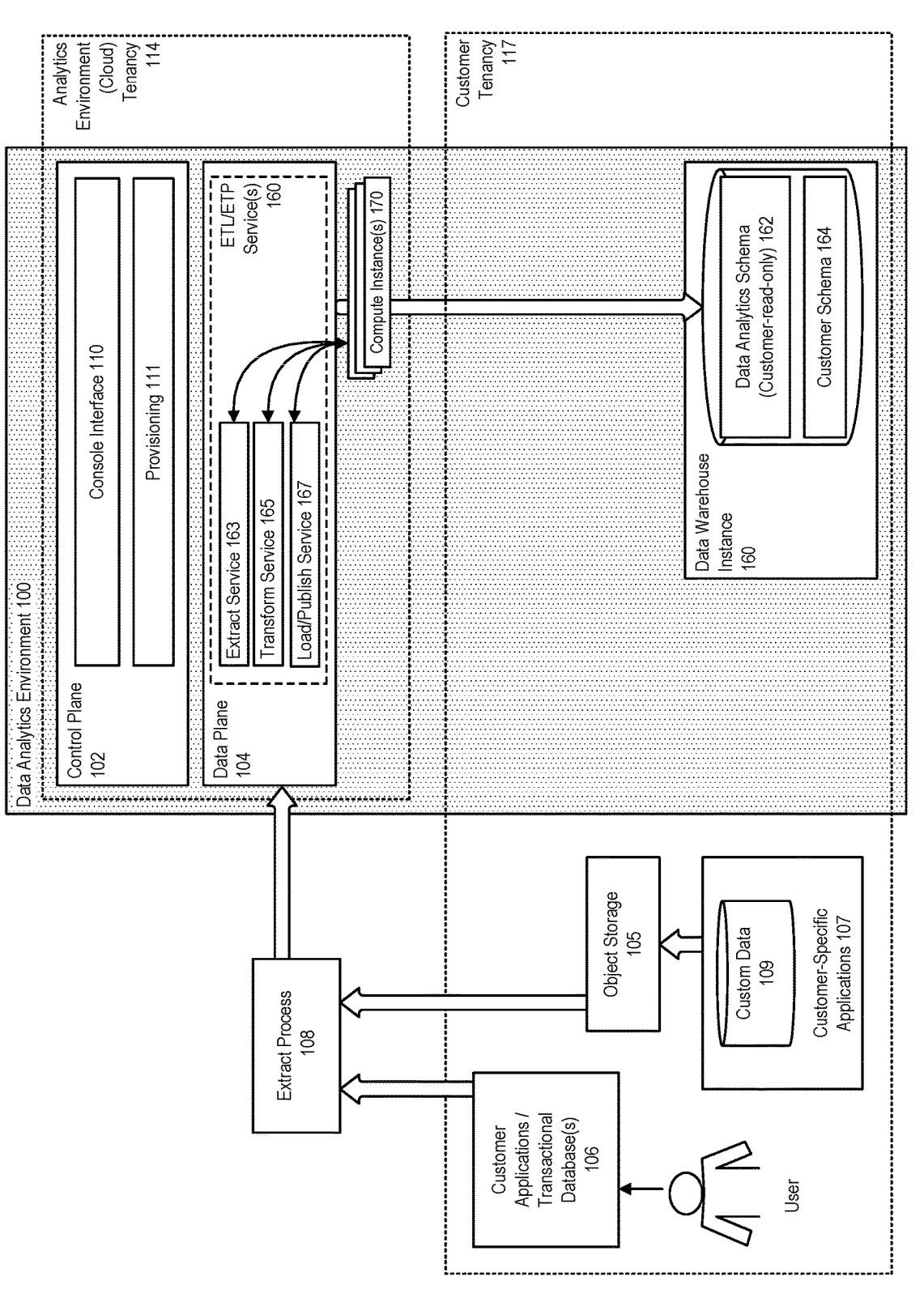
FIG. 4 further illustrates an example data analytics environment, in accordance with an embodiment.

FIG. 4 further illustrates an example data analytics environment, in accordance with an embodiment.

As illustrated in FIG. 4, in accordance with an embodiment, the process of extracting data, e.g., from a customer's (tenant's) enterprise software application or data environment, using the data pipeline process as described above; or as custom data sourced from one or more customer-specific applications; and loading the data to a data warehouse instance, or refreshing the data in a data warehouse, generally involves three broad stages, performed by an ETP service 160 or process, including one or more extraction service 163; transformation service 165; and load/publish service 167, executed by one or more compute instance(s) 170.

For example, in accordance with an embodiment, a list of view objects for extractions can be submitted, for example, to an Oracle BI Cloud Connector (BICC) component via a REST call. The extracted files can be uploaded to an object storage component, such as, for example, an Oracle Storage Service (OSS) component, for storage of the data. The transformation process takes the data files from object storage component (e.g., OSS), and applies a business logic while loading them to a target data warehouse, e.g., an ADW database, which is internal to the data pipeline or process, and is not exposed to the customer (tenant). A load/publish service or process takes the data from the, e.g., ADW database or warehouse, and publishes it to a data warehouse instance that is accessible to the customer (tenant).

Figure 5:
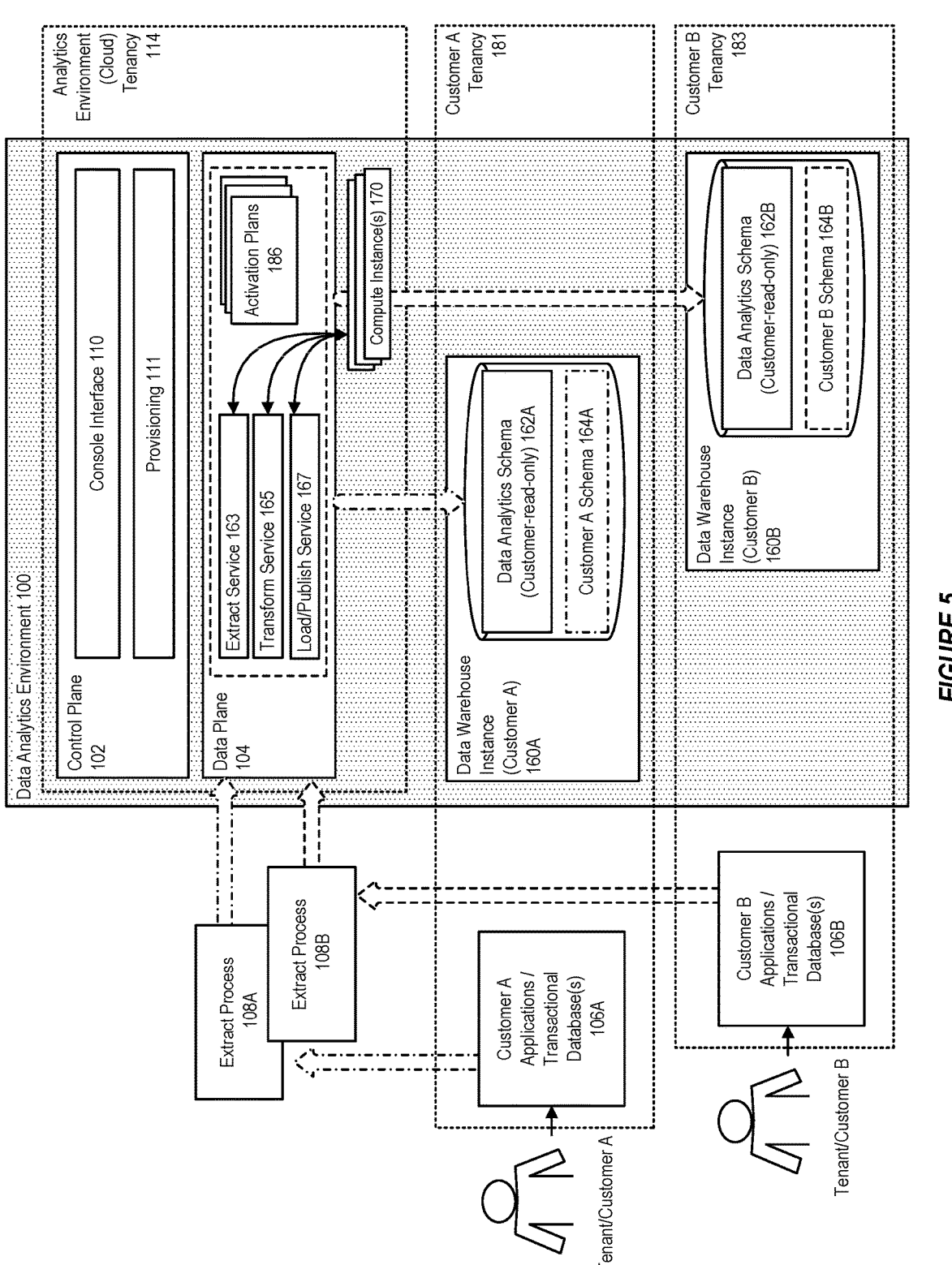
FIG. 5 further illustrates an example data analytics environment, in accordance with an embodiment.

FIG. 5 further illustrates an example data analytics environment, in accordance with an embodiment.

As illustrated in FIG. 5, which illustrates the operation of the system with a plurality of tenants (customers) in accordance with an embodiment, data can be sourced, e.g., from each of a plurality of customer's (tenant's) enterprise software application or data environment, using the data pipeline process as described above; and loaded to a data warehouse instance.

In accordance with an embodiment, the data pipeline or process maintains, for each of a plurality of customers (tenants), for example customer A 180, customer B 182, a data analytics schema that is updated on a periodic basis, by the system in accordance with best practices for a particular analytics use case.

In accordance with an embodiment, for each of a plurality of customers (e.g., customers A, B), the system uses the data analytics schema 162A, 162B, that is maintained and updated by the system, to pre-populate a data warehouse instance for the customer, based on an analysis of the data within that customer's enterprise applications environment 106A, 106B, and within each customer's tenancy (e.g., customer A tenancy 181, customer B tenancy 183); so that data is retrieved, by the data pipeline or process, from the customer's environment, and loaded to the customer's data warehouse instance 160A, 160B.

In accordance with an embodiment, the data analytics environment also provides, for each of a plurality of customers of the environment, a customer schema (e.g., customer A schema 164A, customer B schema 164B) that is readily modifiable by the customer, and which allows the customer to supplement and utilize the data within their own data warehouse instance.

As described above, in accordance with an embodiment, for each of a plurality of customers of the data analytics environment, their resultant data warehouse instance operates as a database whose contents are partly-controlled by the customer; and partly-controlled by the data analytics environment (system); including that their database appears pre-populated with appropriate data that has been retrieved from their enterprise applications environment to address various analytics use cases. When the extract process 108A, 108B for a particular customer has completed its extraction, the data transformation layer can be used to begin the transformation process, to transform the extracted data into a model format to be loaded into the customer schema of the data warehouse.

In accordance with an embodiment, activation plans 186 can be used to control the operation of the data pipeline or process services for a customer, for a particular functional area, to address that customer's (tenant's) particular needs.

For example, in accordance with an embodiment, an activation plan can define a number of extract, transform, and load (publish) services or steps to be run in a certain order, at a certain time of day, and within a certain window of time.

In accordance with an embodiment, each customer can be associated with their own activation plan(s). For example, an activation plan for a first Customer A can determine the tables to be retrieved from that customer's enterprise software application environment (e.g., their Fusion Applications environment), or determine how the services and their processes are to run in a sequence; while an activation plan for a second Customer B can likewise determine the tables to be retrieved from that customer's enterprise software application environment, or determine how the services and their processes are to run in a sequence.

Figure 6:
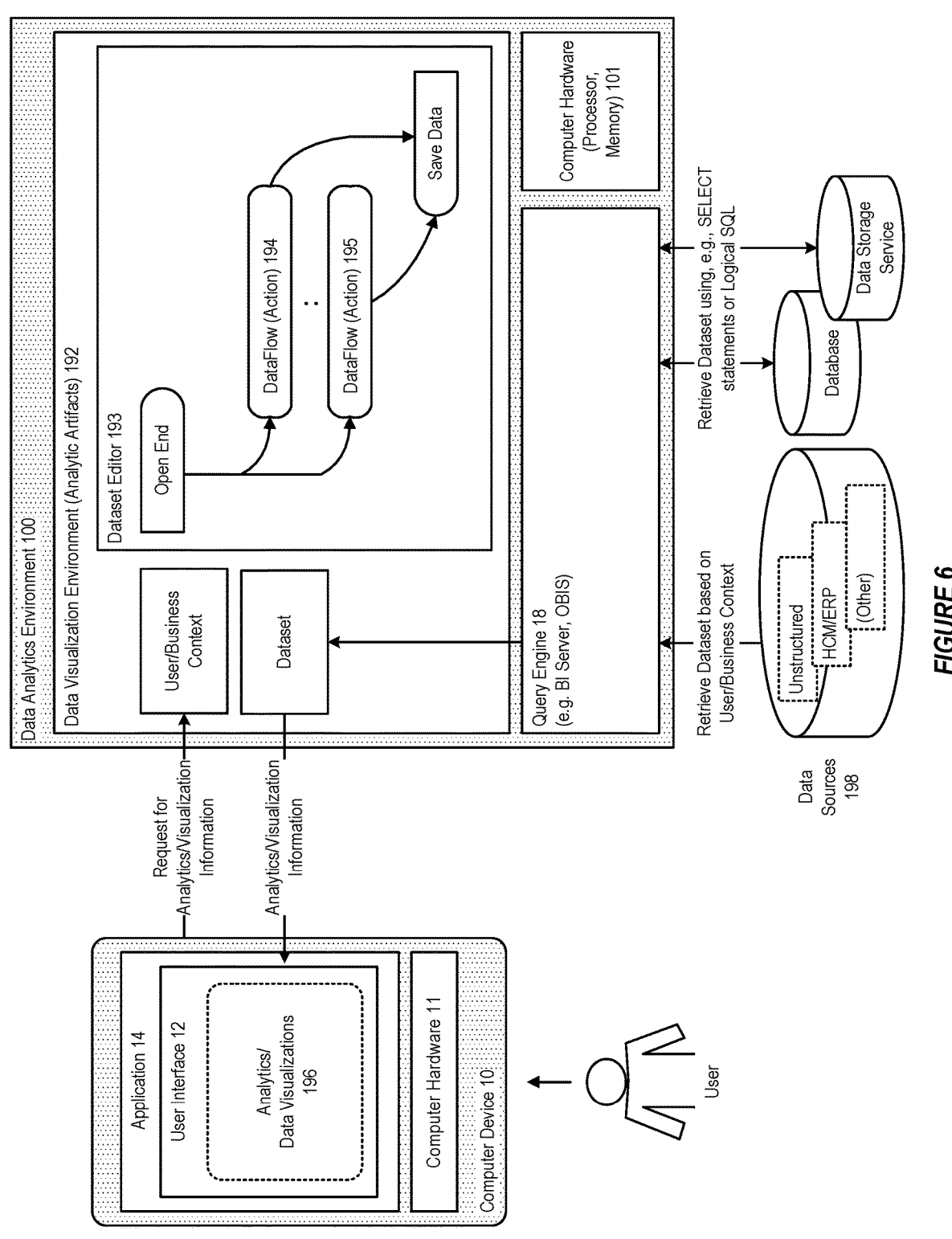
FIG. 6 illustrates a use of the system to transform, analyze, or visualize data, in accordance with an embodiment.

FIG. 6 illustrates a use of the system to transform, analyze, or visualize data, in accordance with an embodiment.

As illustrated in FIG. 6, in accordance with an embodiment, the systems and methods disclosed herein can be used to provide a data visualization environment 192 that enables insights for users of an analytics environment with regard to analytic artifacts and relationships among the same. A model can then be used to visualize relationships between such analytic artifacts via, e.g., a user interface, as a network chart or visualization of relationships and lineage between artifacts (e.g., User, Role, DV Project, Dataset, Connection, Dataflow, Sequence, ML Model, ML Script).

In accordance with an embodiment, a client application can be implemented as software or computer-readable program code executable by a computer system or processing device, and having a user interface, such as, for example, a software application user interface or a web browser interface. The client application can retrieve or access data via an Internet/HTTP or other type of network connection to the analytics system, or in the example of a cloud environment via a cloud service provided by the environment.

In accordance with an embodiment, the user interface can include or provide access to various dataflow action types, as described in further detail below, that enable self-service text analytics, including allowing a user to display a dataset, or interact with the user interface to transform, analyze, or visualize the data, for example to generate graphs, charts, or other types of data analytics or visualizations of dataflows.

In accordance with an embodiment, the analytics system enables a dataset to be retrieved, received, or prepared from one or more data source(s), for example via one or more data source connections. Examples of the types of data that can be transformed, analyzed, or visualized using the systems and methods described herein include HCM, HR, or ERP data, e-mail or text messages, or other of free-form or unstructured textual data provided at one or more of a database, data storage service, or other type of data repository or data source.

For example, in accordance with an embodiment, a request for data analytics or visualization information can be received via a client application and user interface as described above, and communicated to the analytics system (in the example of a cloud environment, via a cloud service). The system can retrieve an appropriate dataset to address the user/business context, for use in generating and returning the requested data analytics or visualization information to the client. For example, the data analytics system can retrieve a dataset using, e.g., SELECT statements or Logical SQL instructions.

In accordance with an embodiment, the system can create a model or dataflow that reflects an understanding of the dataflow or set of input data, by applying various algorithmic processes, to generate visualizations or other types of useful information associated with the data. The model or dataflow can be further modified within a dataset editor 193 by applying various processing or techniques to the dataflow or set of input data, including for example one or more dataflow actions 194, 195 or steps that operate on the dataflow or set of input data. A user can interact with the system via a user interface, to control the use of dataflow actions to generate data analytics, data visualizations 196, or other types of useful information associated with the data.

In accordance with an embodiment, datasets are self-service data models that a user can build for data visualization and analysis requirements. A dataset contains data source connection information, tables, and columns, data enrichments and transformations. A user can use a dataset in multiple workbooks and in dataflows.

In accordance with an embodiment, when a user creates and builds a dataset, they can, for example: choose between many types of connections or spreadsheets; create datasets based on data from multiple tables in a database connection, an Oracle data source, or a local subject area; or create datasets based on data from tables in different connections and subject areas.

For example, in accordance with an embodiment, a user can build a dataset that includes tables from an Autonomous Data Warehouse connection, tables from a Spark connection, and tables from a local subject area; specify joins between tables; and transform and enrich the columns in the dataset.

In accordance with an embodiment, additional artifacts, features, and operations associated with datasets can include, for example:

View available connections: a dataset uses one or more connections to data sources to access and supply data for analysis and visualization. A user list of connections contains the connections that they built and the connections that they have permission to access and use.

Create a dataset from a connection: when a user creates a dataset, they can add tables from one or more data source connections, add joins, and enrich data.

Add multiple connections to a dataset: a dataset can include more than one connection. Adding more connections allows a user to access and join all of the tables and data that they need to build the dataset. The user can add more connections to datasets that support multiple tables.

Create dataset table joins: joins indicate relationships between a dataset's tables. If the user is creating a dataset based on facts and dimensions and if joins already exist in the source tables, then joins are automatically created in the dataset. If the user is creating a dataset from multiple connections and schemas, then they can manually define the joins between tables.

In accordance with an embodiment, a user can use dataflows to create datasets by combining, organizing, and integrating data. Dataflows enable the user to organize and integrate data to produce curated datasets that either they or other users can visualize.

For example, in accordance with an embodiment, a user might use a dataflow to: Create a dataset; Combine data from different source; aggregate data; and train a machine learning model or apply a predictive machine learning model to their data.

In accordance with an embodiment, a dataset editor as described above allows a user to add actions or steps, wherein each step performs a specific function, for example, add data, join tables, merge columns, transform data, or save the data. Each step is validated when the user adds or changes it. When they have configured the dataflow, they can execute it to produce or update a dataset.

In accordance with an embodiment, a user can curate data from datasets, subject areas, or database connections. The user can execute dataflows individually or in a sequence. The user can include multiple data sources in a dataflow and specify how to join them. The user can save the output data from a dataflow in either a dataset or in a supported database type.

In accordance with an embodiment, additional artifacts, features, and operations associated with dataflows can include, for example:

Add columns: add custom columns to a target dataset.

Add data: add data sources to a dataflow. For example, if the user is merging two datasets, they add both datasets to the dataflow.

Aggregate: create group totals by applying aggregate functions; for example, count, sum, or average.

Branch: creates multiple outputs from a dataflow.

Filter: select only the data that the user is interested in.

Join: combine data from multiple data sources using a database join based on a common column.

Graph Analytics: perform geo-spatial analysis, such as calculating the distance or the number of hops between two vertices.

The above are provided by way of example; in accordance with an embodiment other types of steps can be added to a dataflow to transform a dataset or provide data analytics or visualizations.

Dataset Analyses and Visualizations

In accordance with an embodiment, the system provides functionality that allows a user to generate datasets, analyses, or visualizations for display within a user interface, for example to explore datasets or data sourced from multiple data sources.

FIGS. 7-18 illustrate various examples of user interfaces for use with a data analytics environment, in accordance with an embodiment.

The user interfaces and features shown in FIGS. 7-18 are provided by way of example, for purposes of illustration of the various features described herein; in accordance with various embodiments, alternative examples of user interfaces and features can be provided.

Figure 7:
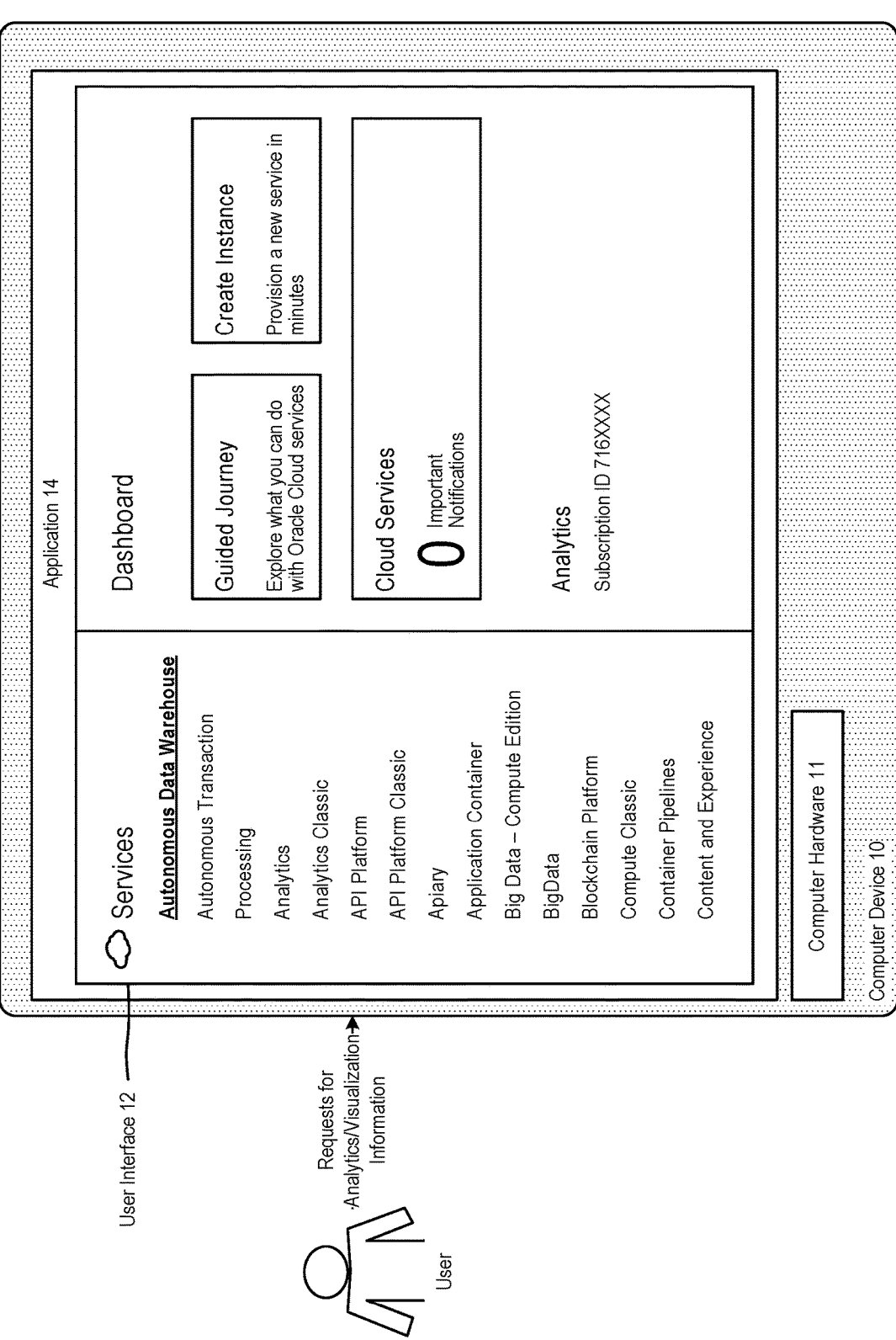
FIG. 7 illustrates various examples of user interfaces for use with a data analytics environment, in accordance with an embodiment.
Figure 8:
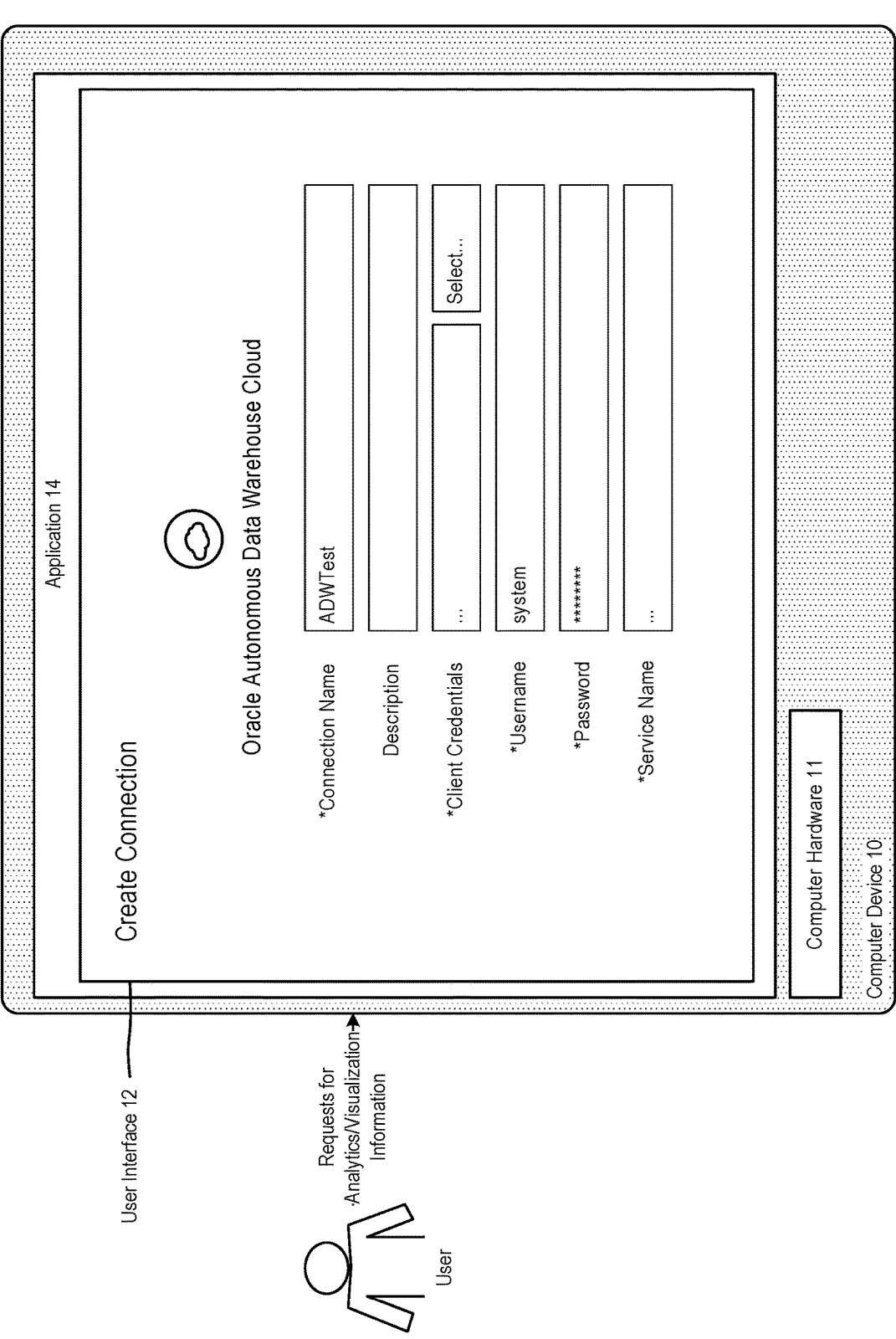
FIG. 8 illustrates various examples of user interfaces for use with a data analytics environment, in accordance with an embodiment.

As illustrated in FIGS. 7-8, in accordance with an embodiment, the user can access the data analytics environment, for example to submit analyses or queries against an organization's data.

For example, in accordance with an embodiment, the user can choose between various types of connections to create datasets based on data from tables in, e.g., a database connection, an Oracle subject area, an Oracle ADW connection, or a spreadsheet, file, or other type of data source. In this manner, a dataset operates as a self-service data model from which the user can build a data analysis or visualization.

Figure 9:
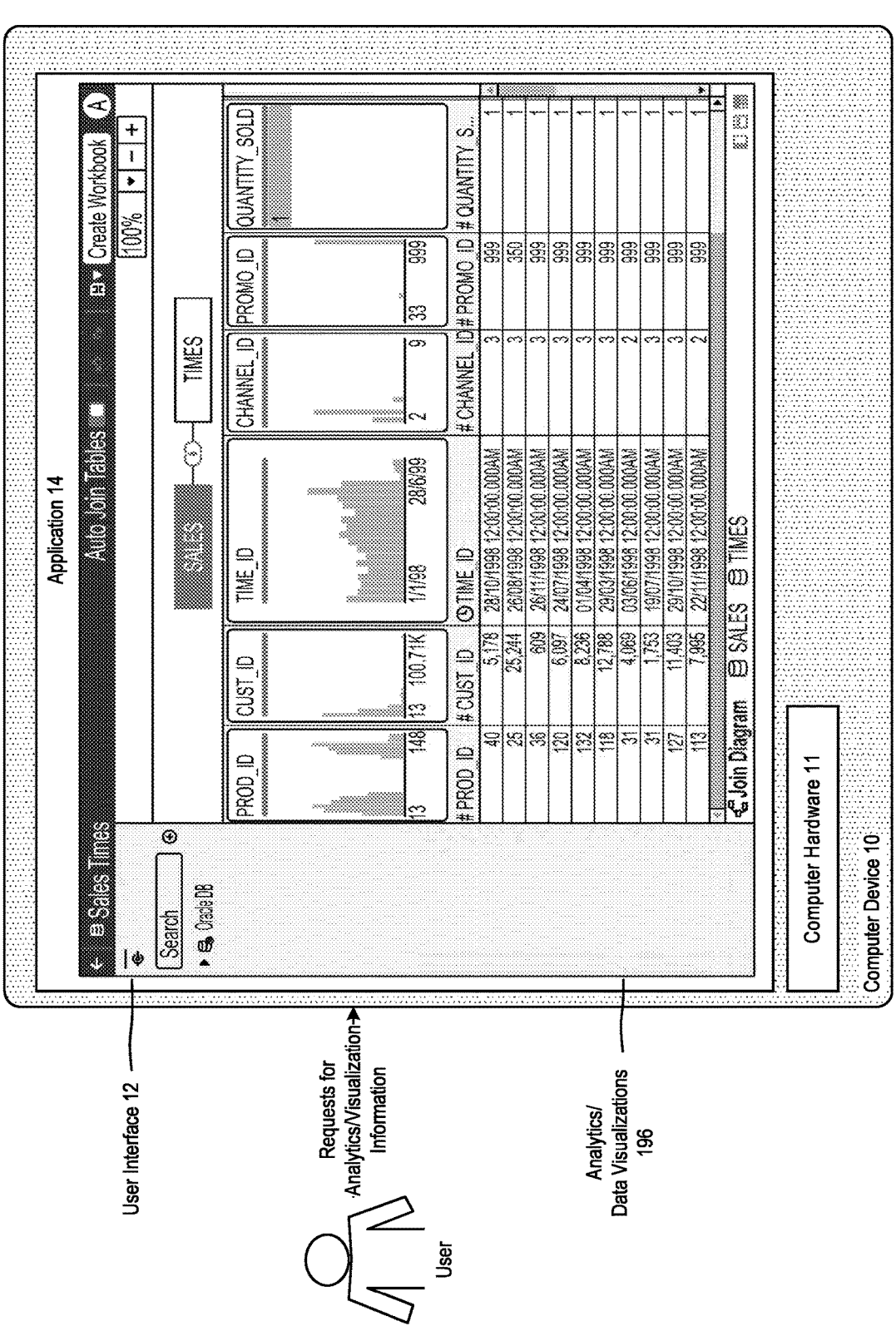
FIG. 9 illustrates various examples of user interfaces for use with a data analytics environment, in accordance with an embodiment.
Figure 10:
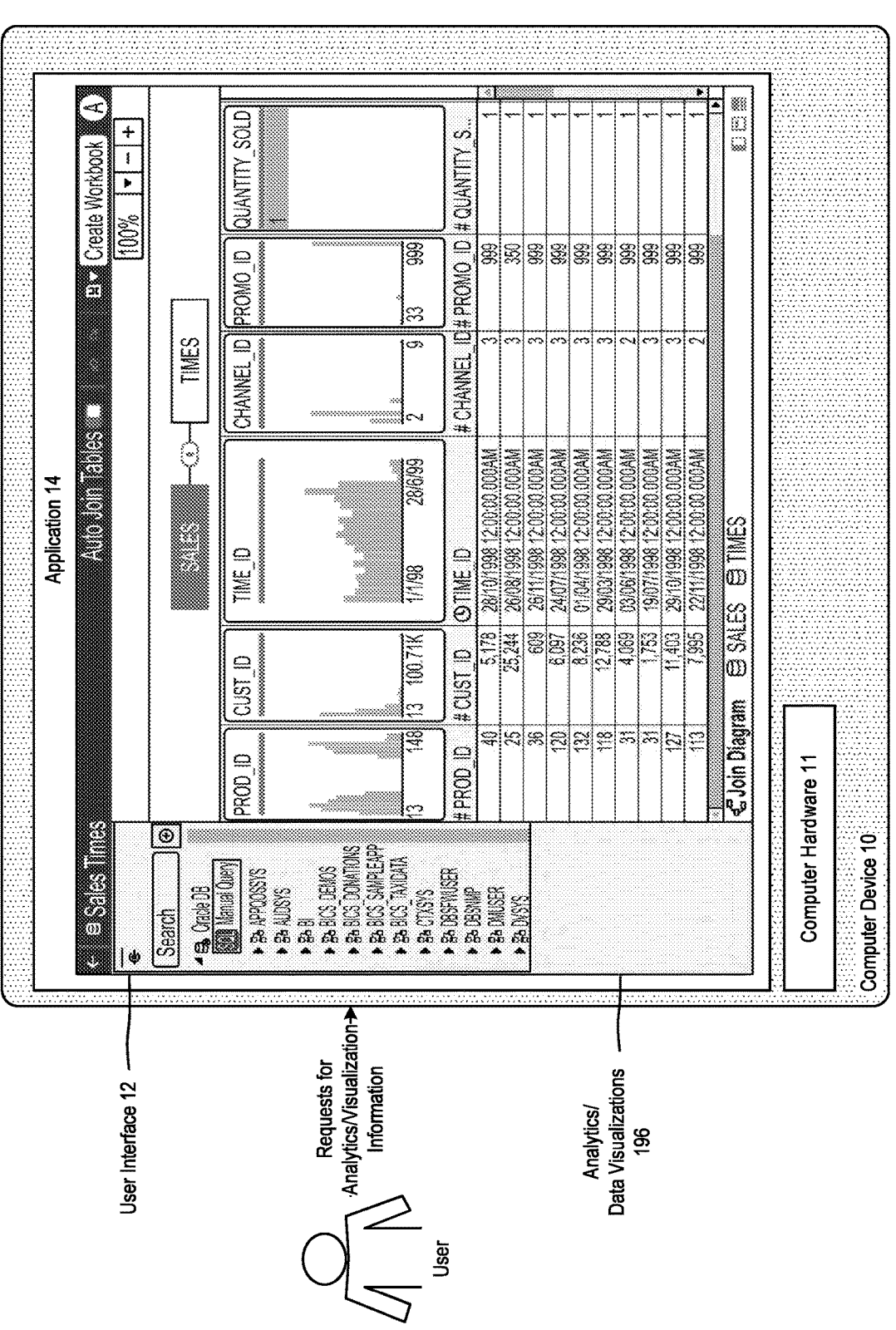
FIG. 10 illustrates various examples of user interfaces for use with a data analytics environment, in accordance with an embodiment.

As illustrated in FIGS. 9-10, in accordance with an embodiment, a dataset editor can display a list of connections which the user has permission to access, and allow the user to create or edit a dataset that includes tables, joins, and/or enriched data. The editor can display the data source connection's schemas and tables, from which the user can drag and drop to a dataset diagram. If a particular connection does not itself provide a schema and table listing the user can use a manual query for appropriate tables. Adding connections provide the ability to access and join their associated tables and data, to build the dataset.

Figure 11:
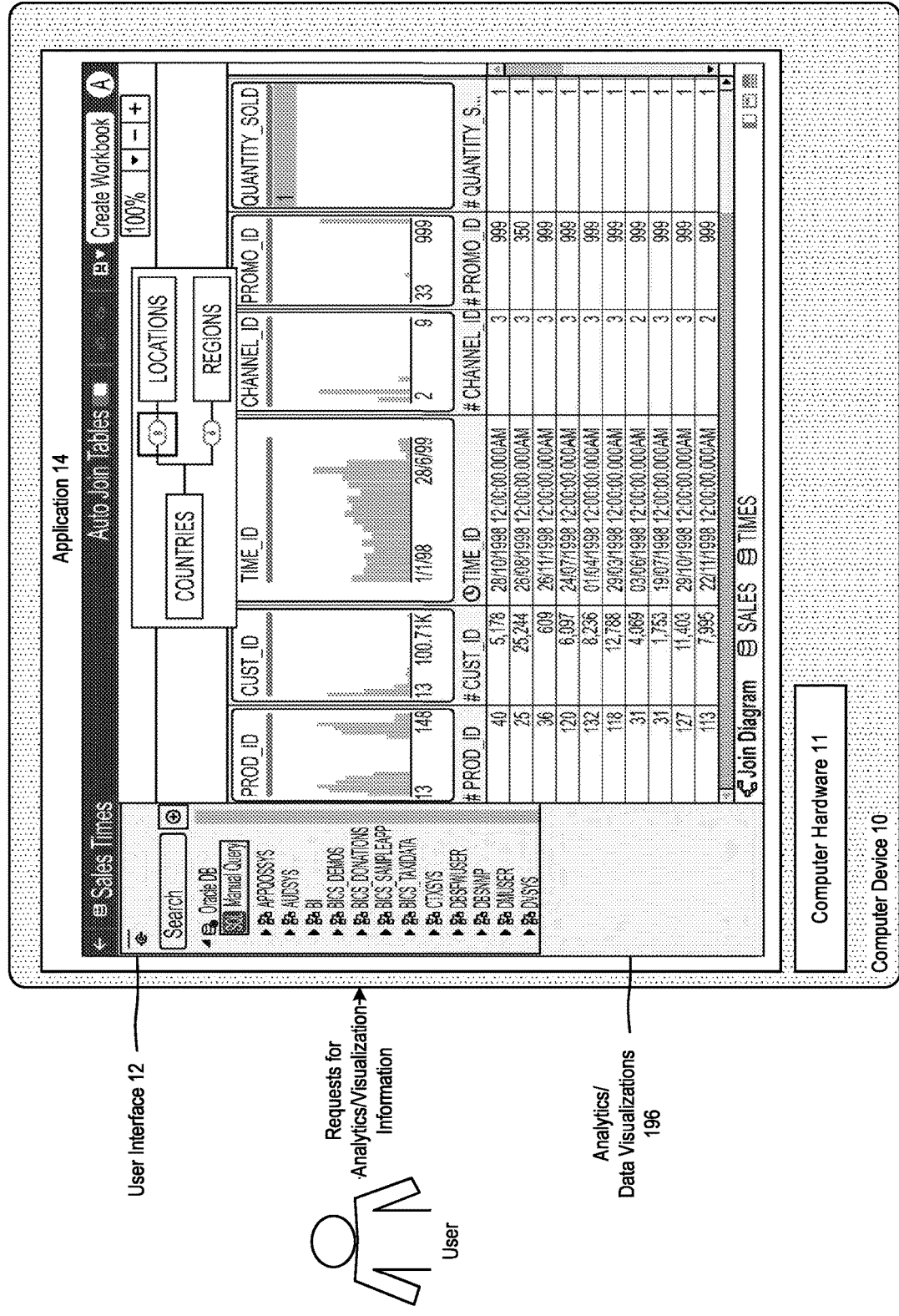
FIG. 11 illustrates various examples of user interfaces for use with a data analytics environment, in accordance with an embodiment.
Figure 12:
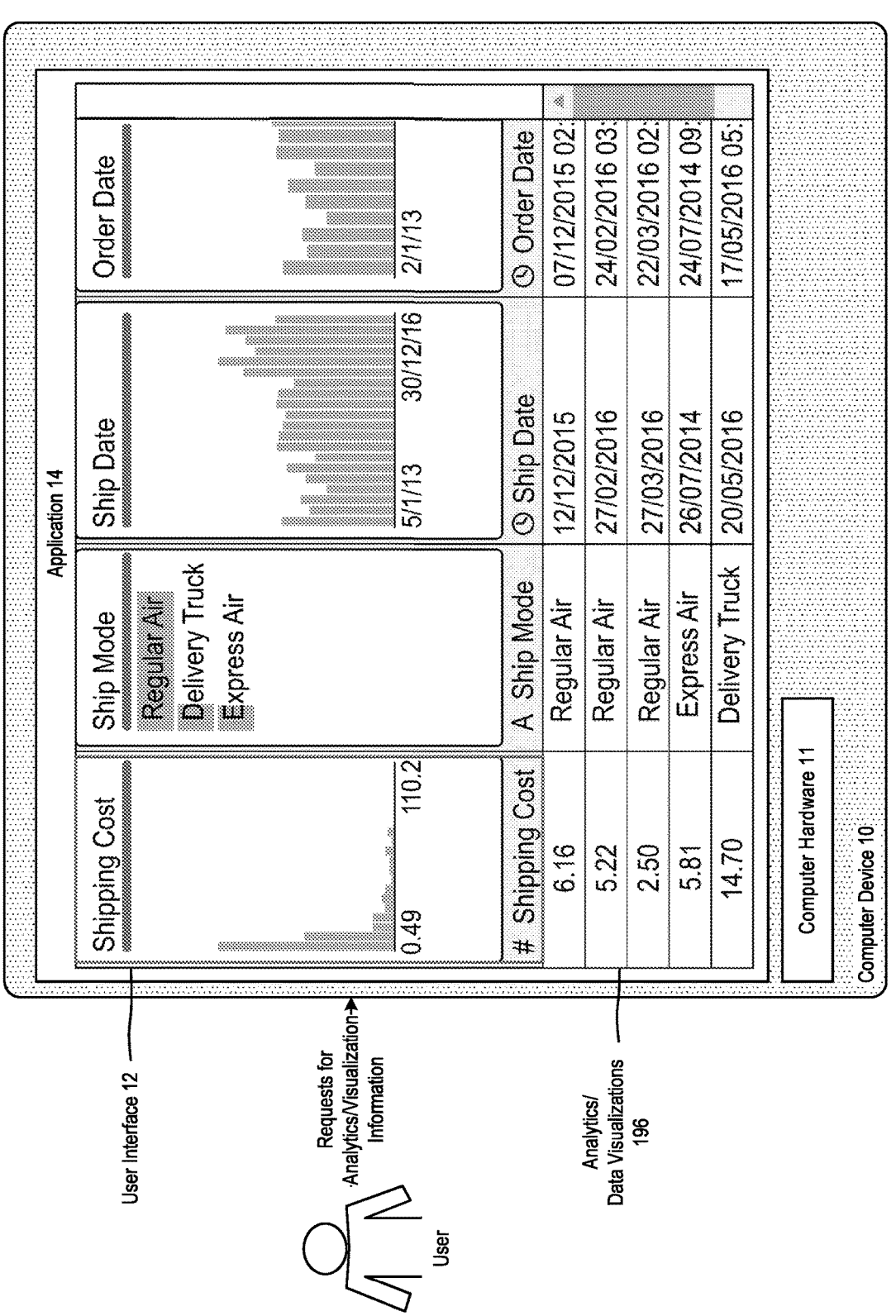
FIG. 12 illustrates various examples of user interfaces for use with a data analytics environment, in accordance with an embodiment.
Figure 13:
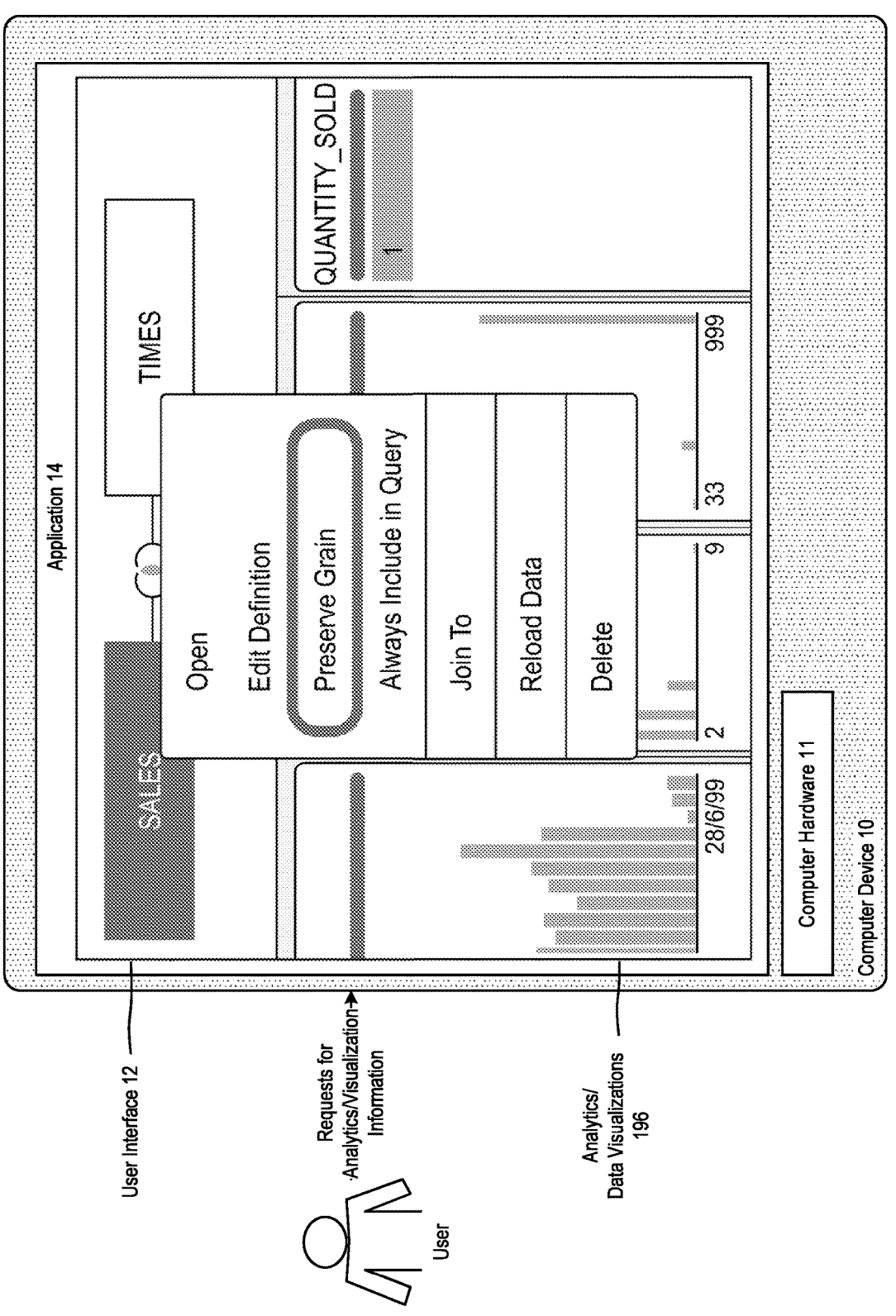
FIG. 13 illustrates various examples of user interfaces for use with a data analytics environment, in accordance with an embodiment.

As illustrated in FIGS. 11-12, in accordance with an embodiment, within the dataset editor a join diagram displays the tables and joins in a dataset. Joins that are defined in the data source can be automatically created between tables in the dataset, for example, by creating joins based on column name matches found between the tables.

In accordance with an embodiment, when the user selects a table, a preview data area displays a sample of the table's data. Displayed join links and icons indicate which tables are joined and the type of join used. The user can create a join by dragging and dropping one table onto another; click on a join to view or update its configuration; or click a column's type attribute to change its type, for example from a measure to an attribute.

In accordance with an embodiment, the system can generate source-specific optimized queries for a visualization, wherein a dataset is treated as a data model and only those tables needed to satisfy a visualization are used in the query.

By default a dataset's grain is determined by the table with the lowest grain. The user can create a measure in any table in a dataset; however, this can cause the measure on one side of a one-to-many or many-to-many relationship to be duplicated. In accordance with an embodiment illustrated in FIG. 13, to address this, the user can set the table on one side of a cardinality to preserve grain, to keep its level of detail.

Figure 14:
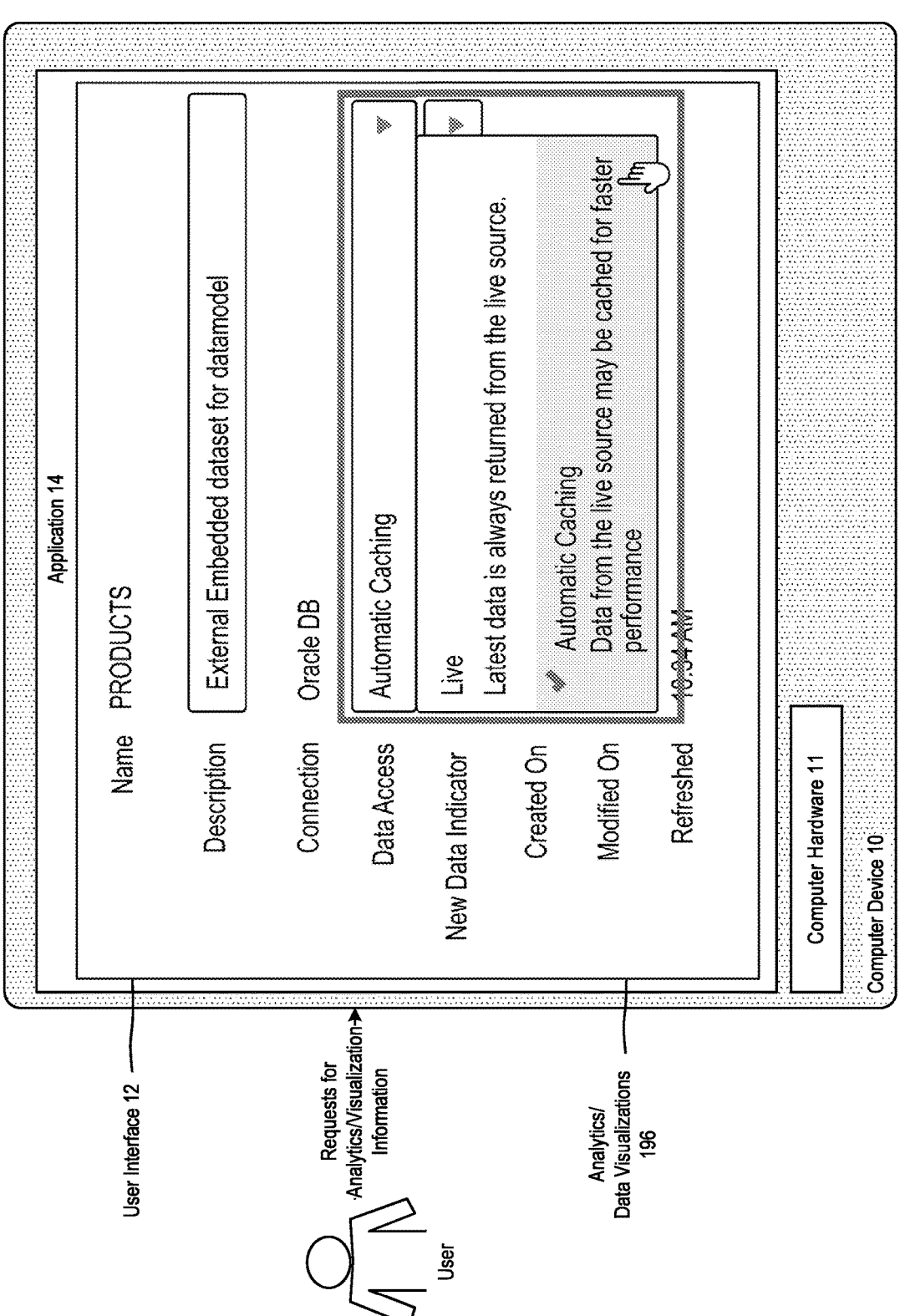
FIG. 14 illustrates various examples of user interfaces for use with a data analytics environment, in accordance with an embodiment.

As illustrated in FIG. 14, in accordance with an embodiment, dataset tables can be associated with a data access setting that determines if the system will load the table into cache, or alternatively if the table will receive its data directly from the data source.

In accordance with an embodiment, when automatic caching mode is selected for a table, the system loads or reloads the table data into cache, which provides faster performance when the table's data is refreshed, e.g., from a workbook, and causes the reload menu option to display at the table and dataset level.

In accordance with an embodiment, when live mode is selected for a table, the system retrieves the table data directly from the data source; and the source system manages the table's data source queries. This option is useful when the data is stored in a high-performance data warehouse such as, for example, Oracle ADW; and also ensures that the most-current data is used.

In accordance with an embodiment, when a dataset uses multiple tables, some tables can use automatic caching, while others can include live data. During reload of multiple tables using the same connection, if the reloading of data on one table fails, then any tables presently set to use automatic caching are switched to using live mode to retrieve their data.

In accordance with an embodiment, the system allows a user to enrich and transform their data before it is made available for analysis. When a workbook is created and a dataset added to it, the system performs column level profiling on a representative sample of the data. After profiling the data, the user can implement transformation and enrichment recommendations provided for recognizable columns in the dataset; such as, for example, GPS enrichments such as latitude and longitude for cities or zip codes.

In accordance with an embodiment, the data transformation and enrichment changes applied to a dataset affect the workbooks and dataflows that use the dataset. For example, when the user opens a workbook that shares the dataset, they receive a message indicating that the workbook uses updated or refreshed data.

In accordance with an embodiment, dataflows provide a means of organizing and integrating data to produce curated datasets that your users can visualize. For example, the user might use a dataflow to create a dataset, combine data from different sources, aggregate data, or train machine learning models or apply a predictive machine learning model to their data.

Figure 15:
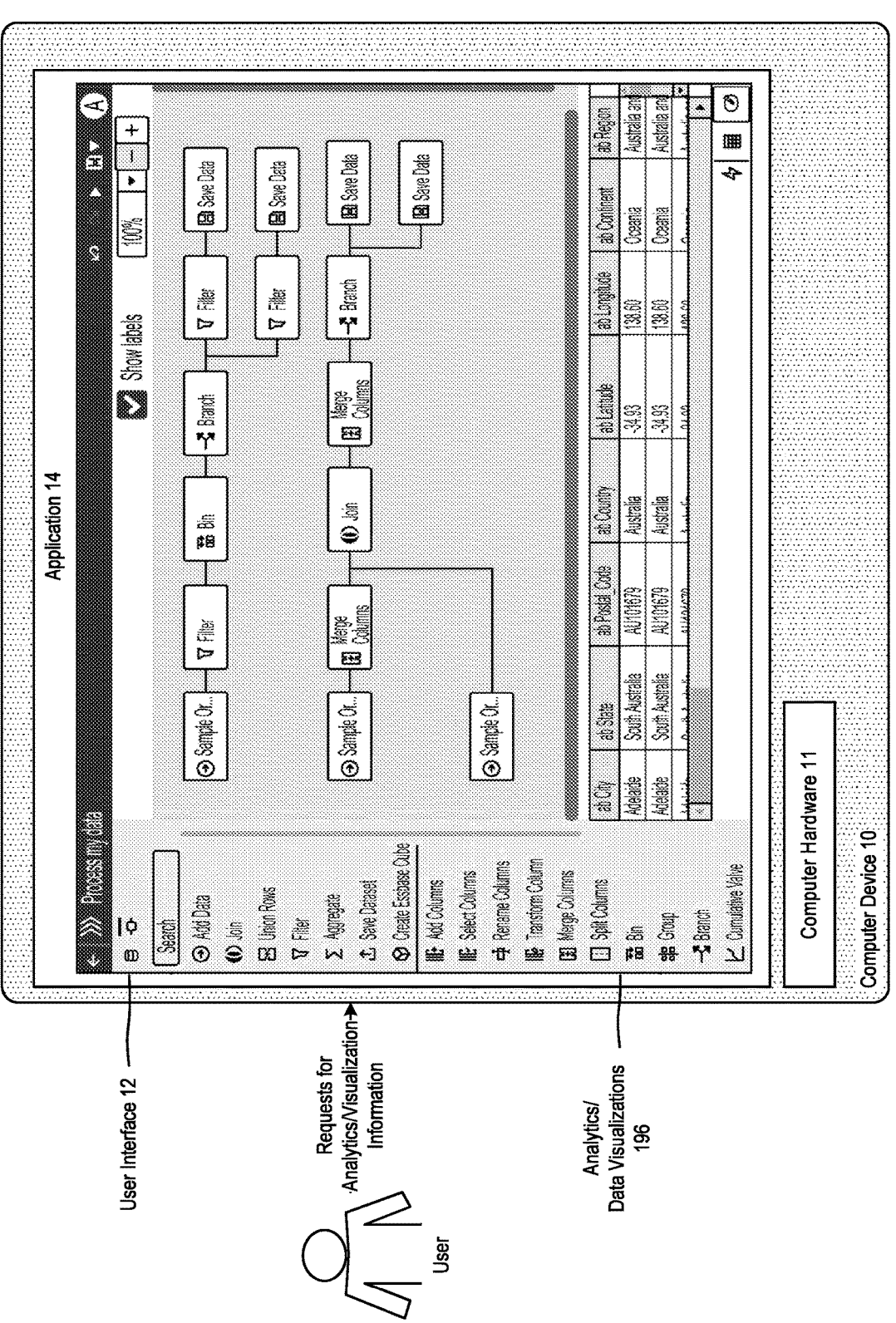
FIG. 15 illustrates various examples of user interfaces for use with a data analytics environment, in accordance with an embodiment.

As illustrated in FIG. 15, in accordance with an embodiment, within a dataflow each step performs a specific function, for example to add data, join tables, merge columns, transform data, or save data. Once configured, the dataflow can be executed to perform operations to produce or update a dataset, including for example the use of SQL operators, such as BETWEEN, LIKE, IN), conditional expressions, or functions.

In accordance with an embodiment, dataflows can be use merge datasets, cleanse data, and output the results to a new dataset. Dataflows can be executed individually or in a sequence. If any dataflow within a sequence fails, then all the changes made in the sequence are rolled back.

Figure 16:
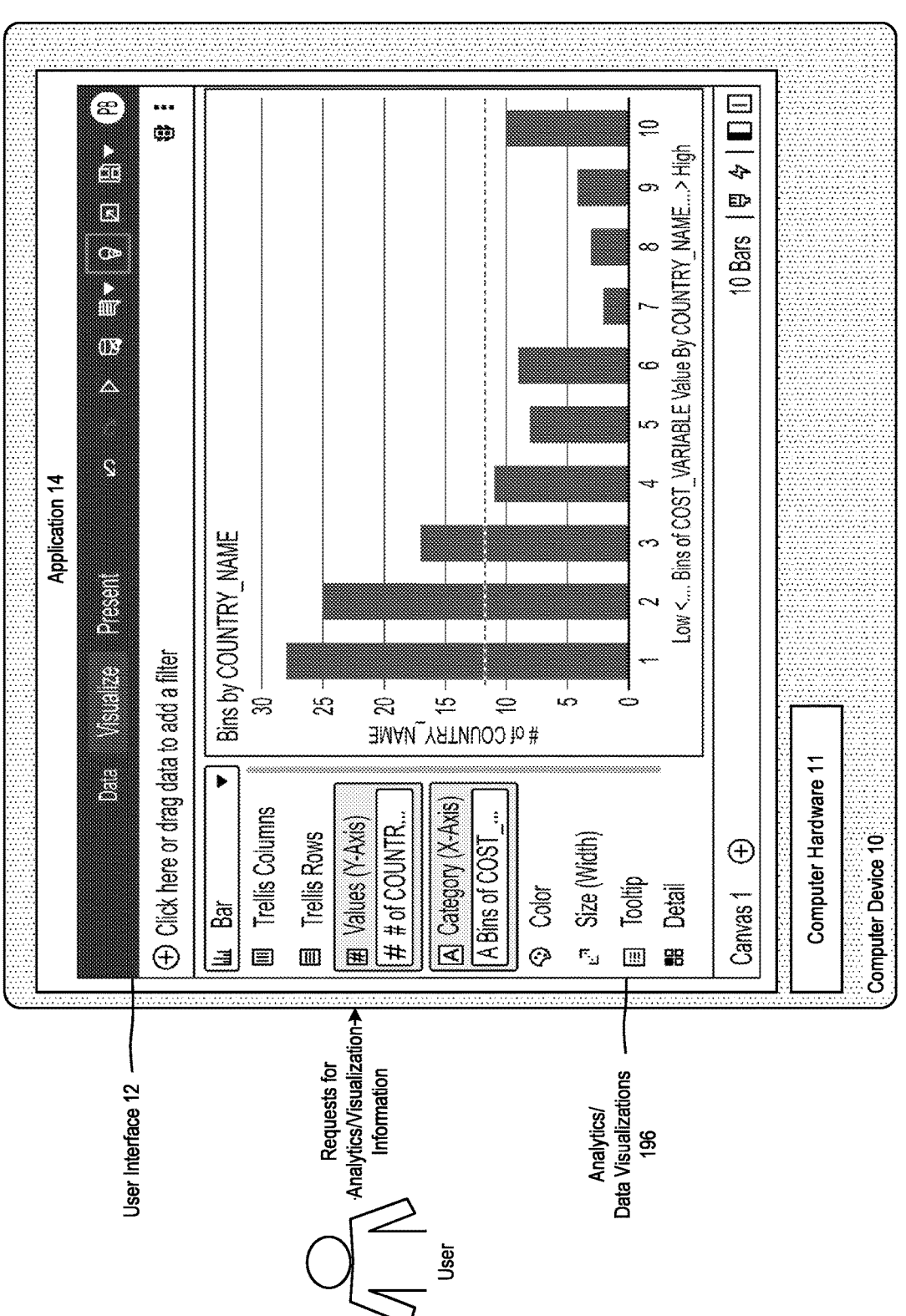
FIG. 16 illustrates various examples of user interfaces for use with a data analytics environment, in accordance with an embodiment.
Figure 17:
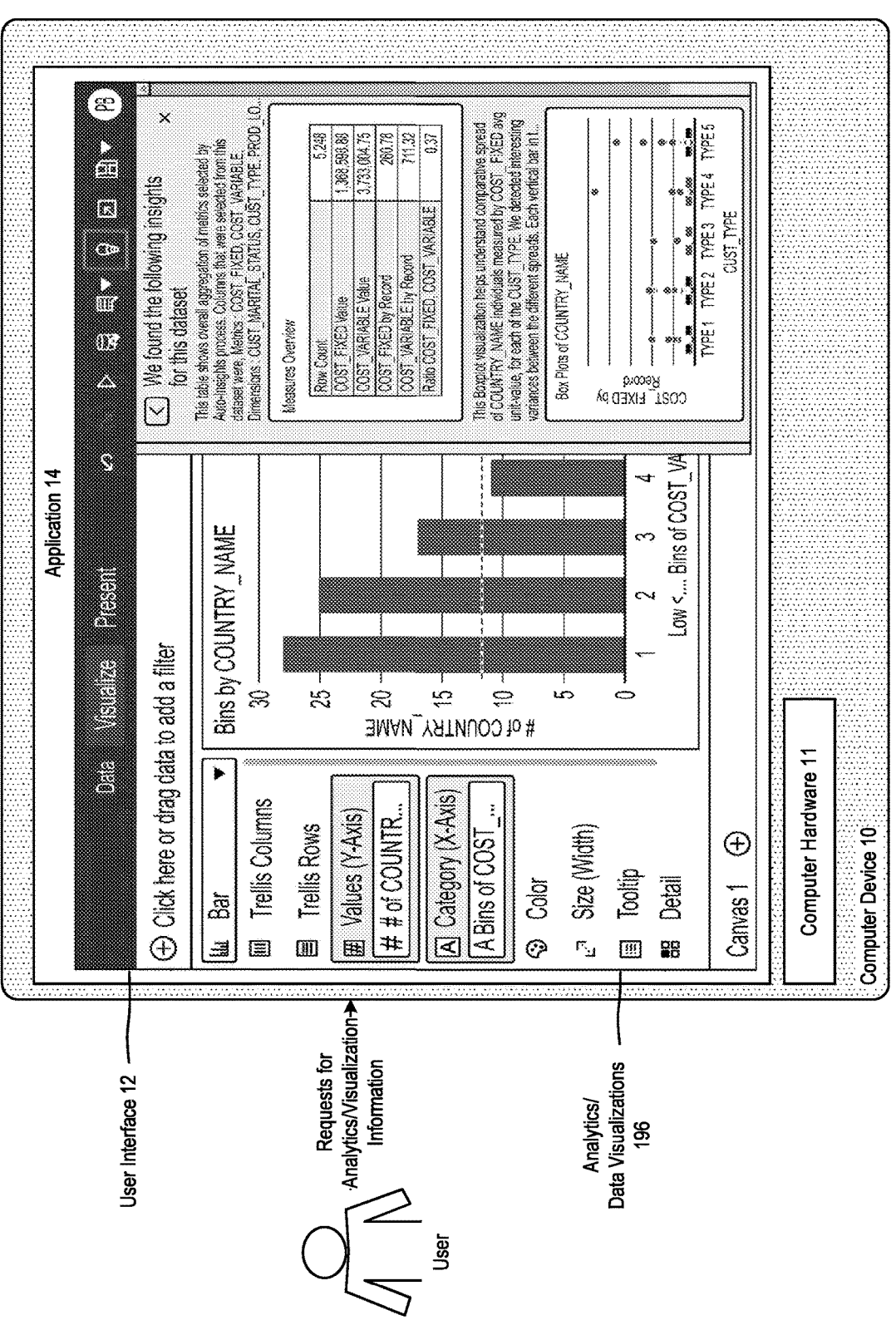
FIG. 17 illustrates various examples of user interfaces for use with a data analytics environment, in accordance with an embodiment.
Figure 18:
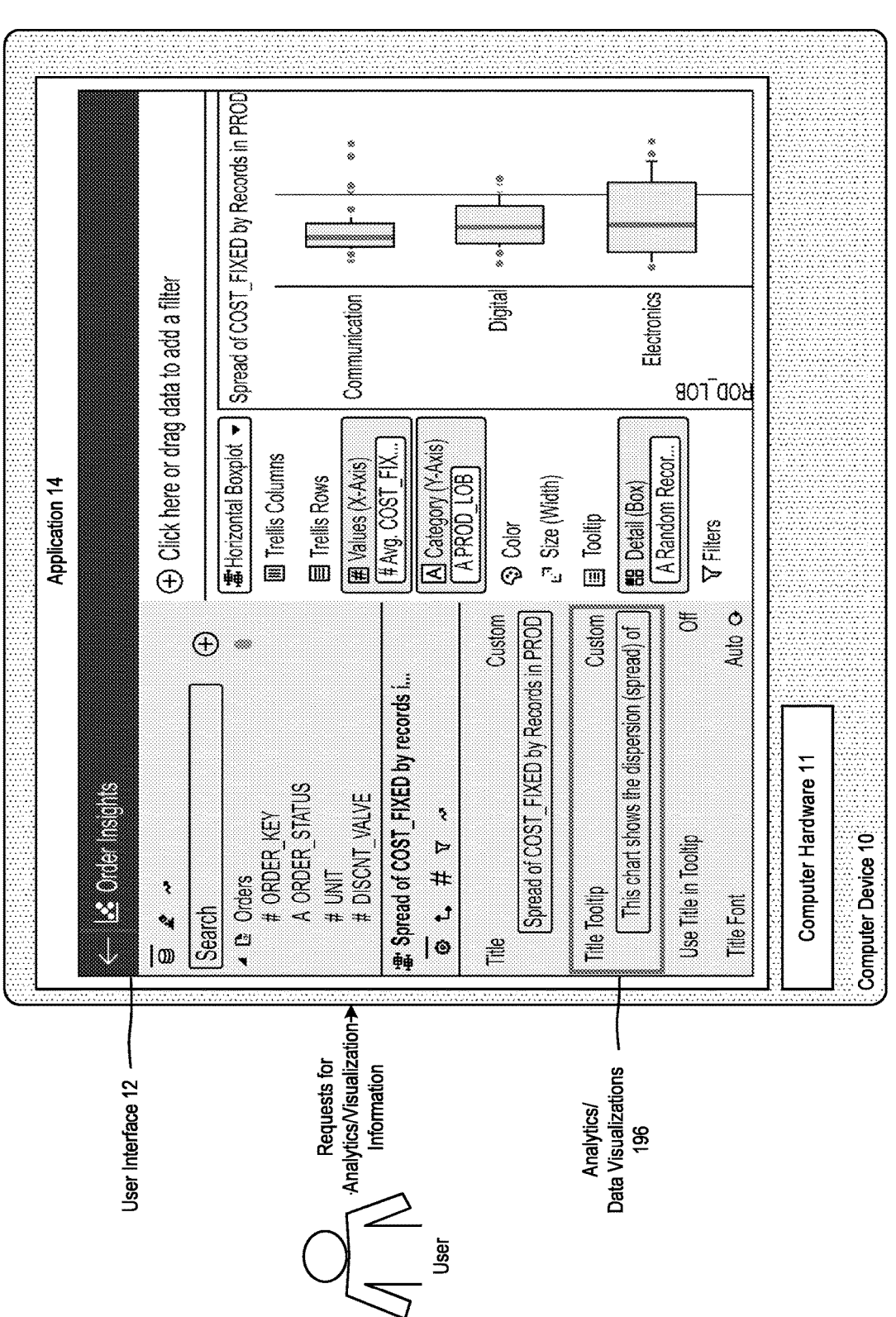
FIG. 18 illustrates various examples of user interfaces for use with a data analytics environment, in accordance with an embodiment.

As illustrated in FIGS. 16-18, in accordance with an embodiment, visualizations can be displayed within a user interface, for example to explore datasets or data sourced from multiple data sources, and to add insights.

For example, in accordance with an embodiment, the user can create a workbook, add a dataset, and then drag and drop its columns onto a canvas to create visualizations. The system can automatically generate a visualization based on the contents of the canvas, with one or more visualization types automatically selected for selection by the user. For example, if the user adds a revenue measure to the canvas, the data element may be placed in a values area of a grammar panel, and a Tile visualization type selected. The user can continue adding data elements directly to the canvas to build the visualization.

In accordance with an embodiment, the system can provide automatically generated data visualizations (automatically-generated insights, auto-insights), by suggesting visualizations which are expected to provide the best insights for a particular dataset. The user can review an insight's automatically generated summary, for example by hovering over the associated visualization in the workbook canvas.

Multi-Hub Datasets

In accordance with an embodiment, described herein is a system and method for providing multi-hub and/or multi-table datasets with a computing environment such as, for example, a business intelligence environment, database, data warehouse, or other type of environment that supports data analytics. An analysis can be used to query data to provide information in the form of tables, graphs, pivot tables, or other data views. A hub table operates as fact table and carries the data metrics for analysis, enabling a user to join two tables, the data from which can be further transformed or enriched to prepare it for analysis.

Within a database or data warehouse, the data of interest may be spread across multiple tables. In such environments, data joins can be used to stitch the data from various tables together, to better prepare the data for analysis. Such joins generally require one or more columns in each table to represent a common data type, and can be performed in a variety of ways, such as for example: inner joins, which return records that have matching values in both tables; left (outer) joins, which return records from a left table with matched records from a right table; right (outer) joins, which return records from the right table with matched records from the left table; and full (outer) joins, which return all of those records that match in either the left or right tables.

Data analytics environments such as, for example, OAC support the ability for a user to specify joins in a variety of ways and via various user interfaces, including for example, BI Repository (RPD) joins, dataflow joins, and data blending.

In accordance with an embodiment, RPD joins can be defined by a user during the development of an (RPD) data model. For example, in an OAC environment, users can access their data through system-provided Subject Areas, and the system will automatically create appropriate joins as the user selects data fields for purpose of analysis, query, or data visualization.

As described above, in accordance with an embodiment, a user interface can include or provide access to dataflow action types that enable self-service text analytics, including allowing a user to display a dataset, or interact with the user interface to transform, analyze, or visualize the data, for example to generate graphs, charts, or other types of data analytics or visualizations. As the user adds datasets as part of a dataflow, the system can determine matching columns within the data, and automatically join tables; or alternatively allow the user to provide a manual configuration of joins within the datasets.

Environments such as OAC also allow for automatic data blending, wherein a user can specify a source of data, for example a database connection and a spreadsheet file, and create a project, whereby the system automatically determines matches for the data within the project, for example based on common column names, and creates joins within the datasets.

In accordance with an embodiment, when the system supports multi-hub and/or multi-table datasets, the user can additionally create a dataset based on data associated with a connection, and then add multiple tables from the same connection. Multi-hub datasets build upon the concept of multi-table datasets—allowing the user to mark one table in a dataset as a fact table (hub table), which effectively acts as the important table, and the other tables are then perceived as dimensions (attribute tables). The server can then construct query plans using this information.

In accordance with an embodiment, when tables are accessed in the dataset editor, the system automatically populates joins, where appropriate, based for example, on common column names or compatible data types, and provides a data preview based on those joins, making it easy for the user to see the effect of adding or modifying the joins.

Figure 19:
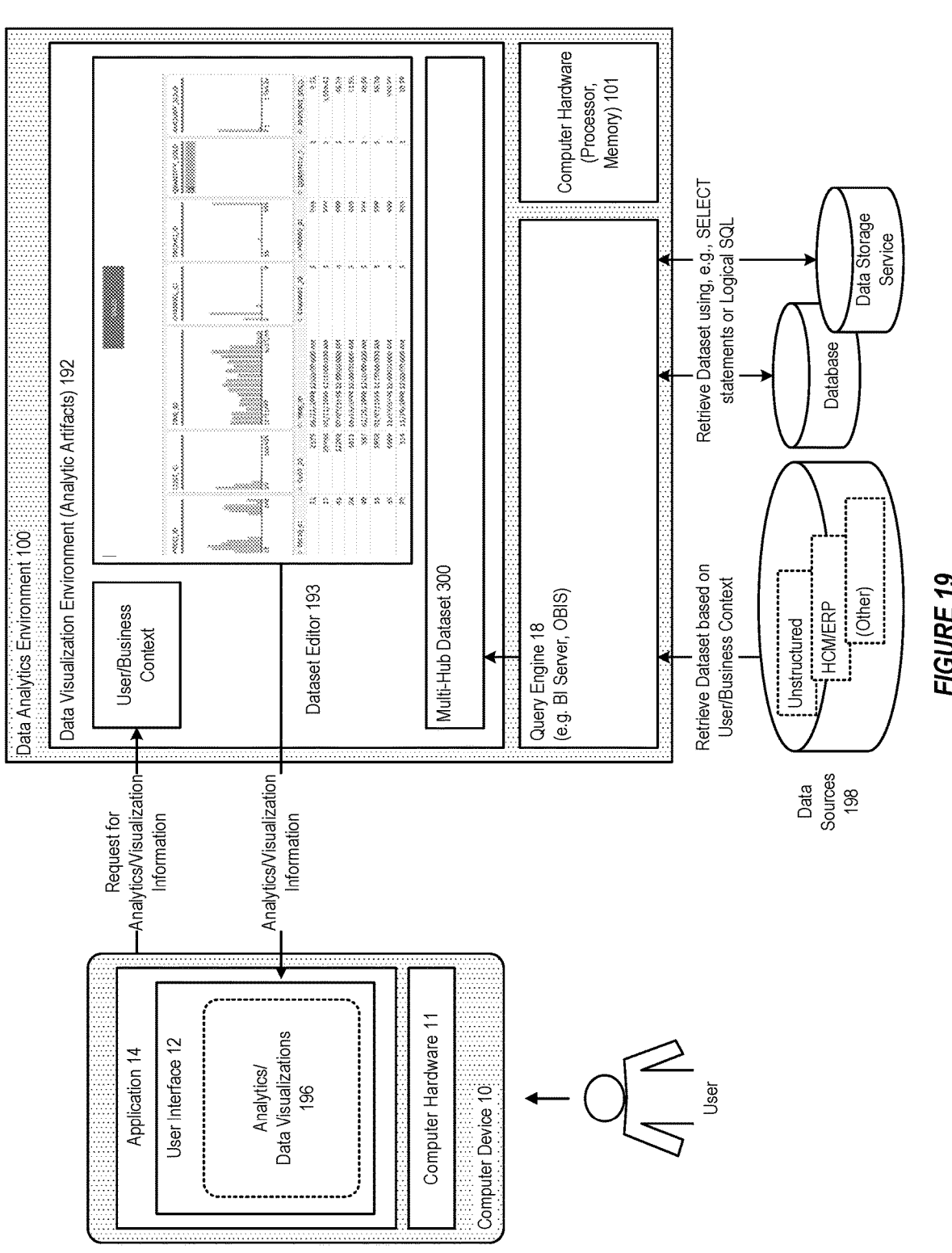
FIG. 19 illustrates the use multi-hub-datasets, in accordance with an embodiment.

FIG. 19 illustrates the use multi-hub-datasets, in accordance with an embodiment.

As illustrated in FIG. 19, in accordance with an embodiment, a dataset editor can display a list of those connections which the user has permission to access, and allow the user to create a data model that includes a selection of tables, joins, and/or enriched data source from those connections. For example, the user can create a data model that includes a multi-hub dataset 300 based on multiple tables, as further described below.

Figure 20:
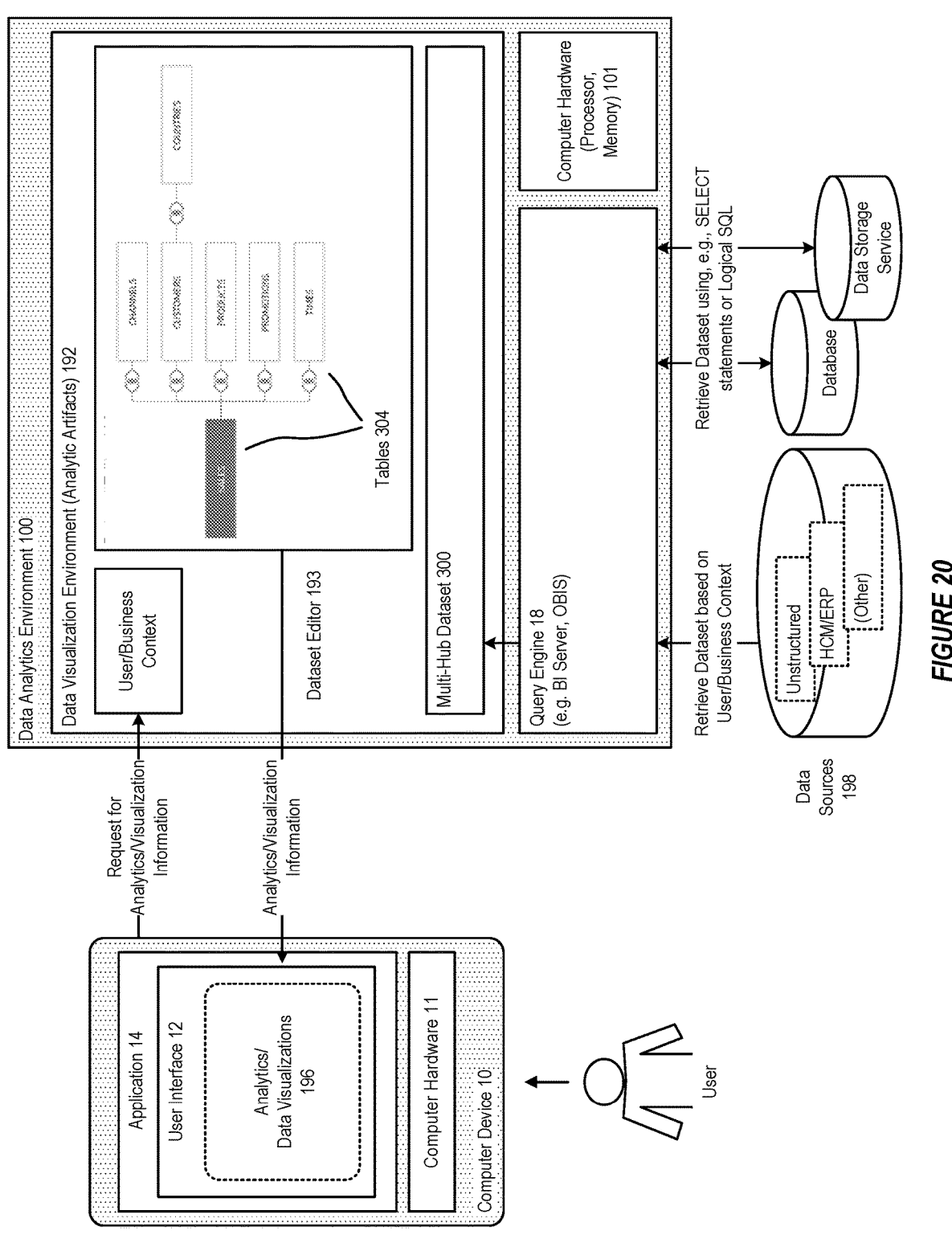
FIG. 20 further illustrates the use multi-hub-datasets, in accordance with an embodiment.

FIG. 20 further illustrates the use multi-hub-datasets, in accordance with an embodiment.

As illustrated in FIG. 20, in accordance with an embodiment, the dataset editor allows the user to drag and drop tables 304 onto their dataset canvas. When the user selects a particular table, a preview data area can display a sample of the table's data.

Figure 21:
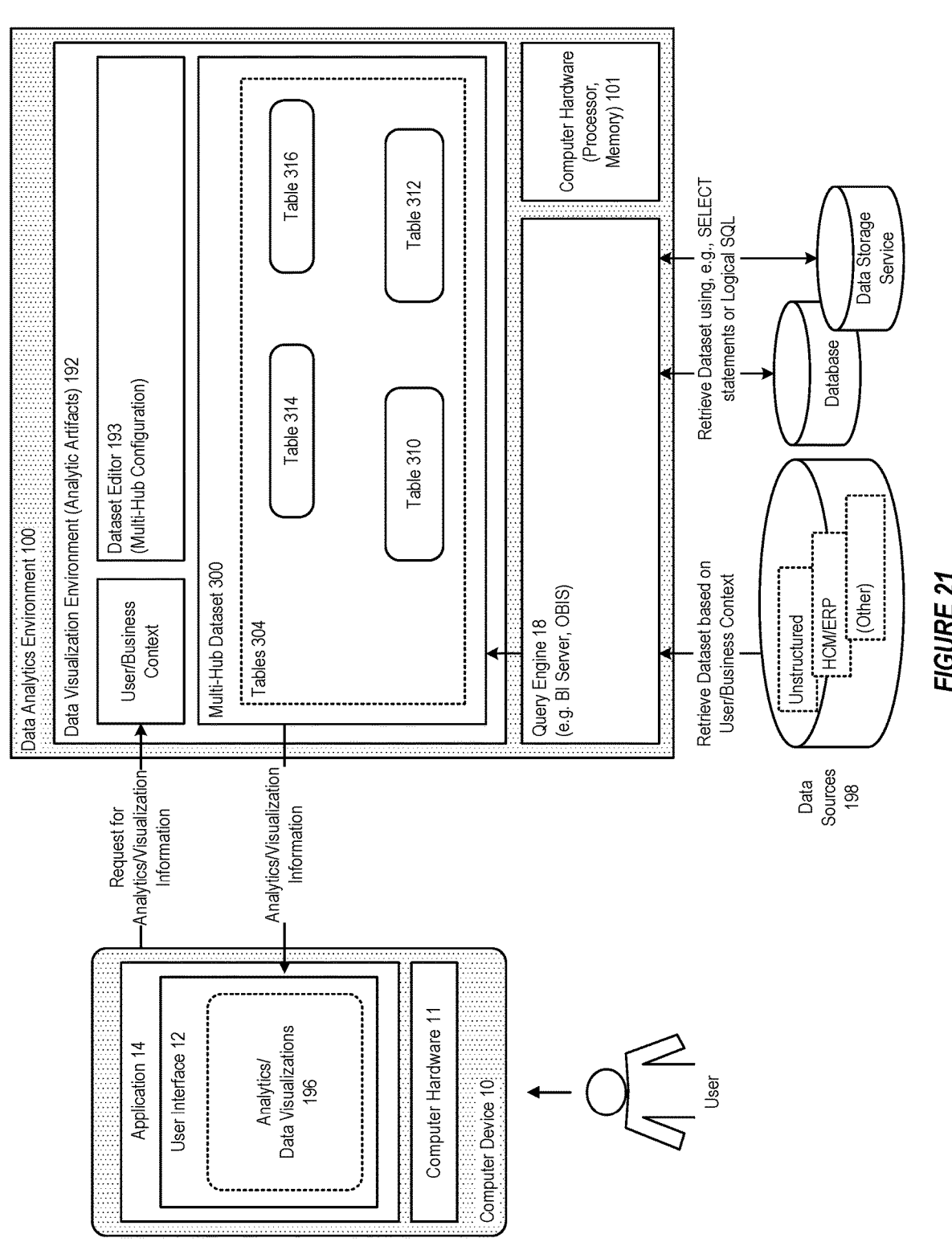
FIG. 21 further illustrates the use multi-hub-datasets, in accordance with an embodiment.

FIG. 21 further illustrates the use multi-hub-datasets, in accordance with an embodiment.

As illustrated in FIG. 21, in accordance with an embodiment, the system can provide an indication of the user's selected tables 310, 312, 314, 316, in order to create the multi-hub dataset.

Figure 22:
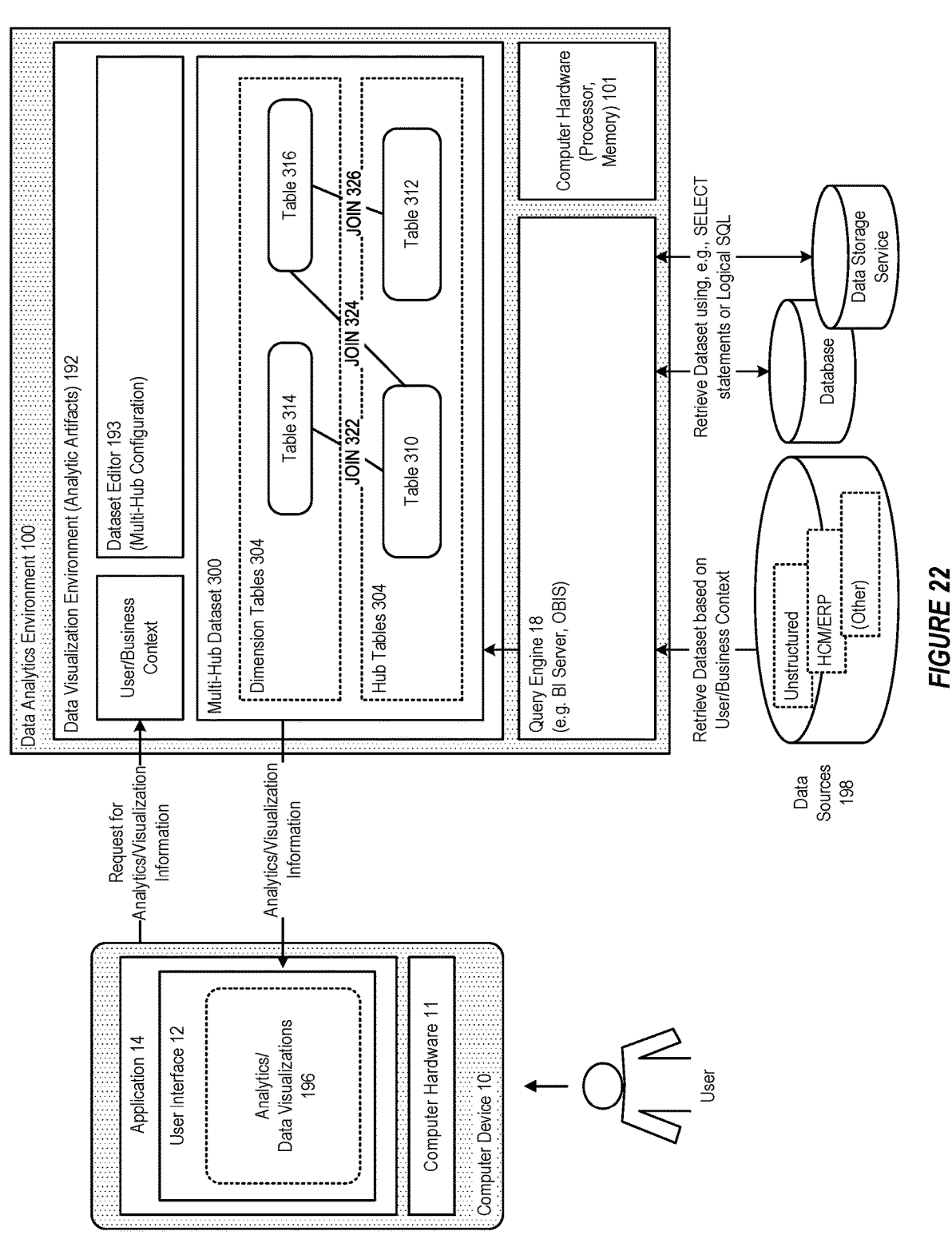
FIG. 22 further illustrates the use multi-hub-datasets, in accordance with an embodiment.

FIG. 22 further illustrates the use multi-hub-datasets, in accordance with an embodiment.

As illustrated in FIG. 22, in accordance with an embodiment, joins 322, 324, 326 are created between the tables within the multi-hub dataset based on the users' data model.

For example, as illustrated in FIG. 22, in accordance with an embodiment, the user can mark a first table as a hub table, for example, in a data visualization environment. The user can then continue to select and mark other tables either as hub tables or dimension tables; which information is persisted in metadata associated with the multi-hub dataset.

In the example illustrated in FIG. 22, the user has identified a plurality of tables 310 and 312 as hub tables; while a plurality of other tables 314 and 316 have been identified by the user as dimension tables. As illustrated, a first table 310 table, operating as a hub table, joins with tables 314 and 316, operating as dimension tables. A second table 312, operating as a hub table, joins with only table 316. In this example, the join types are defined as follows:

TABLE 310

| Table 310 [left outer join] Table 316 |
| Table 310 [inner join] Table 314 |
| Table 312 [left outer join] Table 316 |

In accordance with an embodiment, the system can then create a dataset using the above model, as a multi-hub dataset. As illustrated in the example above, it may be noted that:

A hub table does not necessarily have to join with all dimension tables. For example, as illustrated above, table 312 (e.g., a Sales table) only joins with table 316 (e.g., a Customers table).

Hub tables do not join directly with each other. For example, as illustrated above, table 310 and table 312 do not join directly with each other.

The user has the flexibility to define the join types and join columns. For example, as illustrated above, the user has created the join as an inner-join or left-outer-join.

Figure 23:
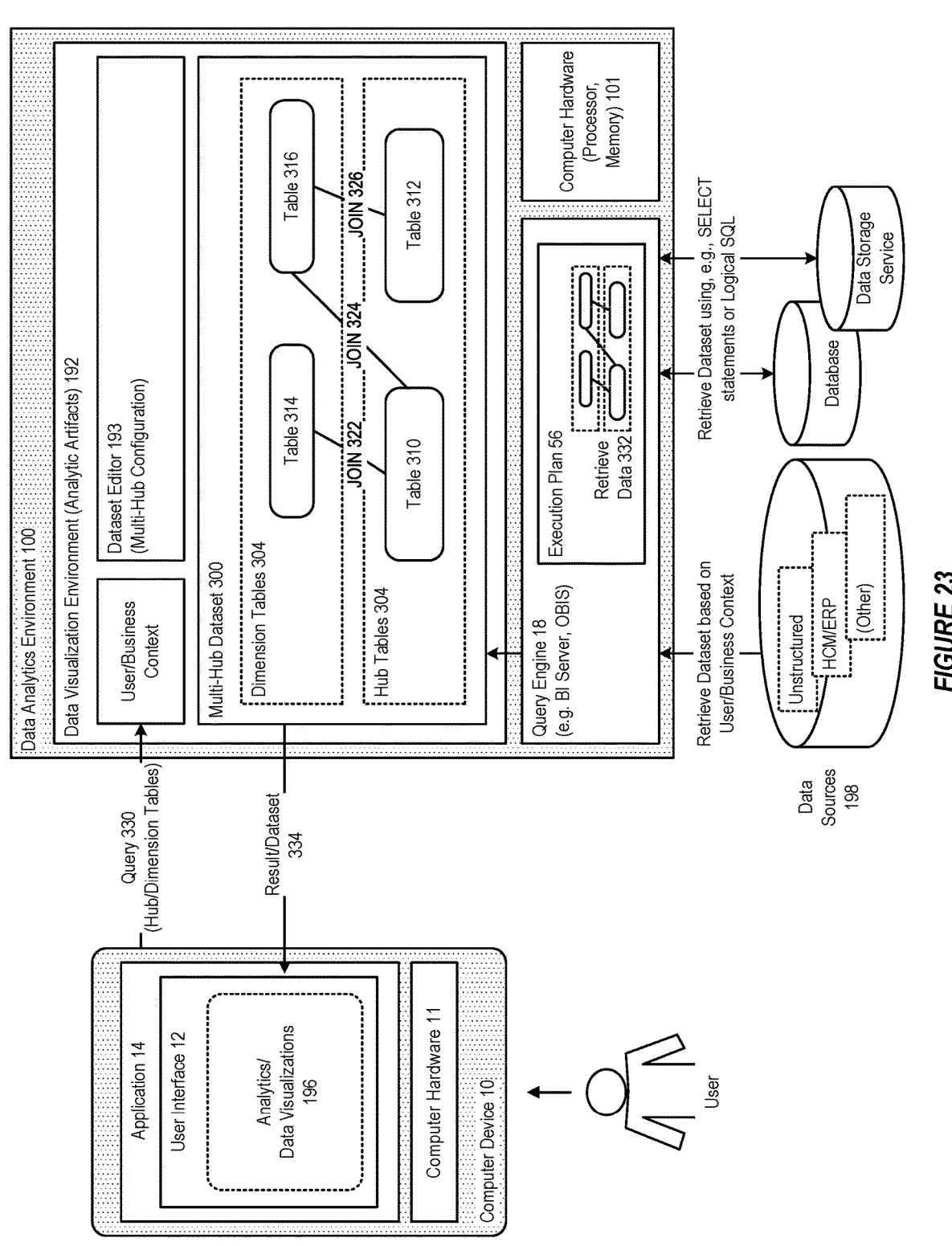
FIG. 23 further illustrates the use multi-hub-datasets, in accordance with an embodiment.

FIG. 23 further illustrates the use multi-hub-datasets, in accordance with an embodiment.

In accordance with an embodiment, in response to an input query 330 for analysis or visualization of a selection of data, the system can push one or more queries 332 to supported databases, in accordance with a query execution plan 56, to retrieve and provide data as a result/dataset 334, for example for purposes of analysis or data visualization.

Figure 24:
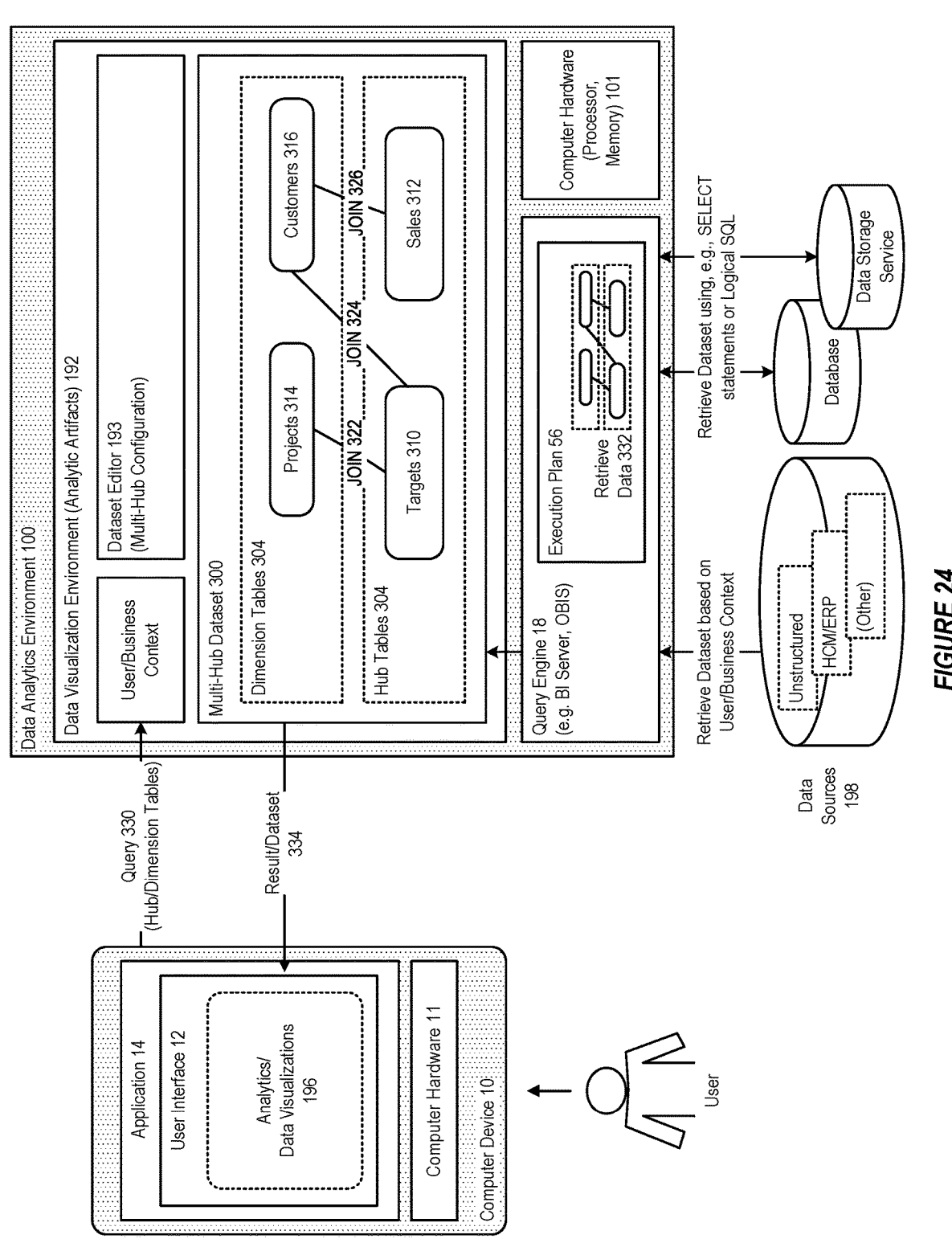
FIG. 24 further illustrates the use multi-hub-datasets, in accordance with an embodiment.

FIG. 24 further illustrates the use multi-hub-datasets, in accordance with an embodiment.

As illustrated in FIG. 24, in accordance with an embodiment, in the example illustrated in FIG. 24, the user has identified both the Targets and Sales tables as hub tables; while the Projects and Customers have been identified by the user as dimension tables. In this example, the Targets table joins with the Customers and Projects table; while the Sales table joins with only the Customers table.

In this example, the join types are defined as follows:

| Targets [left outer join] Customers |
| Targets [inner join] Projects |
| Sales [left outer join] Customers |

In accordance with an embodiment, the system can similarly create a dataset using the above model, as a multi-hub dataset.

FIGS. 25A-27C illustrate example execution plans associated with a multi-hub-datasets, in accordance with an embodiment.

In accordance with an embodiment, in this example, the server stitches a full outer join between the two hub tables (i.e., Targets and Sales which have been previously identified as hub tables). In the example Query 1 illustrated below, the query selects from Customers, Targets, and Sales, wherein the execution plan shows: Sales [left outer join] Customers; with a [full outer join] Targets [left outer join] Customers:

```
Query1:
select
Customer_City City,
TARGET Target,
SALES Sales
from
xsa ('users/administrator/dv_joins/multihub').data
order by 1;
```

The above query when executed by the execution plan (illustrated in FIGS. 25A-25B) returns:

| City | Target | Sales |
|---|---|---|
| City Four | 130.00 | 1300.00 |
| City One | 30.00 | 300.00 |
| City Three | 50.00 | 500.00 |
| City Two | 70.00 | 700.00 |
| Row count: 4 | | |

In the example Query 2 illustrated below, the query selects from Projects, Targets, and Sales, wherein the execution plan shows: Targets [Inner join] Projects; with a [cross product join]: Sales:

```
Query2 :
select
Brand_Category_Brand_Category,
TARGET Target,
```

-continued

```
SALES Sales
from
xsa ('users/administrator/dv_joins/multihub').data
order by 1;
```

The above query when executed by the execution plan (illustrated in FIGS. 26A-26B) returns:

| Brand Category | Target | Sales |
|---|---|---|
| Brand Cat 1 | 100.00 | 2800.00 |
| Brand Cat 2 | 100.00 | 2800.00 |
| Row count: 2 | | |

In this example, since Sales (which as indicated above joins only with Customer) has no join with Projects, the example Query 2 shows the value of Sales as "2800". This is the grand total of all Sales values. In this example, Sales is aggregated "over" the Projects dimension, as is the expected behavior for a full outer join.

In the example Query 3 illustrated below, the query selects from Customers, Projects, Targets, and Sales, wherein the execution plan shows: Sales [left outer join] =Customers with a [full outer join] Targets [left outer join] Customers [Inner join] Projects.

In this example, since Sales (which as indicated above joins only with Customer) has no join with Projects, there is no join with Projects table in the Sales sub-request. If the end user query only selects from one hub table, then the system causes the other hub tables to be pruned away from the query plan.

In accordance with an embodiment, the above=query selects Targets and does not select Sales, wherein the execution plan shows: Targets [left outer join] Customers.

```
Query3:
select
Customer_City,
Brand_Category,
TARGET,
SALES
from
xsa ('users/administrator/dv_joins/multihub').data
order by 2 nulls first, 1;
```

The above query when executed by the execution plan (illustrated in FIGS. 27A-27C) causes the Sales table to be pruned away.

FIG. 28 illustrates a method for the of use multi-hub-datasets, in accordance with an embodiment.

As illustrated in FIG. 28, in accordance with an embodiment, at step 342, an analytics environment is provided, wherein a user can create a data set that uses tables from different connections, wherein the system uses relationships defined between the tables to create joins in the data set, for use in providing data analytics or visualizations.

At step 344, a dataset editor and user interface enables a user to mark a table as a "hub", wherein when a user creates a multi-hub dataset, they can select and mark one or more tables as hub tables, which information is persisted in metadata.

At step 346, a user defines one or more join types and/or join columns for use with the multi-hub dataset.

At step 348, in response to a query directed to the multi-hub dataset, the system determines an execution plan for the query shape, and accesses data sources and returns a result or dataset in response to the query.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although several of the examples provided herein illustrate operation of an analytic applications environment with an enterprise software application or data environment such as, for example, an Oracle Fusion Applications environment; or within the context of a software-as-a-service (SaaS) or cloud environment such as, for example, an Oracle Analytics Cloud or Oracle Cloud Infrastructure environment; in accordance with various embodiments, the systems and methods described herein can be used with other types of enterprise software application or data environments, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for providing multi-hub and/or multi-table datasets with a computing environment that supports data analytics, comprising:

a computer having a processor, memory, and analytics environment operating thereon;

a business intelligence (BI) server that describes data available as subject areas for queries, and receives and processes incoming queries; and a user interface provided by the BI server;

wherein the user interface displays a dataset selector comprising a dataset canvas, the dataset selector providing a drag and drop interface allowing a user to drag a plurality of datasets onto the dataset canvas, wherein each dataset comprises data tables;

wherein an instruction is received via the user interface, the instruction comprising an instruction to mark a plurality of the data tables at the dataset canvas as a plurality of hub tables and an instruction to mark another plurality of the data tables at the dataset canvas as a plurality of dimension tables;

wherein the plurality of the data tables is marked as hub tables and the another plurality of the data tables is marked as dimension tables;

wherein a further instruction is received via the user interface, the further instruction specifying a plurality of joins to be performed between specific ones of the plurality of hub tables and specific ones the plurality of dimension tables, the specific ones of the plurality of hub tables and the specific ones of the plurality of dimension tables being specified within the further instruction, the specified plurality of joins comprising an instruction to join a first hub table with two or more of the plurality of dimension table and another instruction to join a second hub table with one or more of the plurality of hub tables;

wherein, based upon the joins between the plurality of hub tables and the plurality of dimension tables, a multi-hub dataset is defined, the multi-hub dataset comprising metadata indicative of the joins between the plurality of hub tables and the plurality of dimension tables;

wherein upon a query for metrics being received directed to the multi-hub dataset, a query plan is constructed based upon the received query for metrics; and wherein the constructed query plan is run to provide a response to the query by stitching together via a full outer join at least two of the plurality of hub tables together with their respective joins.

2. The system of claim 1, wherein a user can create a data set that uses tables from different connections, wherein the system uses relationships defined between the tables to create joins in the data set, for use in providing data analytics or visualizations.

3. The system of claim 1, wherein a user defines one or more join types and/or join columns for use with the multi-hub dataset; wherein in response to a query directed to the multi-hub dataset, the system determines an execution plan for the query shape, and accesses data sources and returns a result or dataset in response to the query.

4. The system of claim 1, wherein upon receiving the instruction to mark a plurality of the data tables as hub tables, said marking of the plurality of hub tables is persisted in metadata.

5. The system of claim 1, wherein the system is provided within a cloud environment.

6. The system of claim 1, wherein, upon receiving the query for metrics, the query for metrics is determined to be directed to a subset of the plurality of hub tables;

wherein the constructed query plan prunes all of the plurality of hub tables except the subset of the plurality of hub tables to which the query for metrics is directed to; and wherein only the subset of the plurality of hub tables are stitched together to provide a response to the query.

7. The system of claim 1, wherein an additional join is automatically determined and executed, the additional join automatically joining a third hub table of the plurality of hub tables with one or more of the plurality of dimension tables based upon an automatic determination of a common column name or compatible data type between the third hub table and the one or more of the plurality of dimension tables.

8. A method for providing multi-hub and/or multi-table datasets with a computing environment that supports data analytics, comprising:

providing, at one or more computers having a processor, memory, for use with a data analytics environment, a business intelligence (BI) server that describes data available as subject areas for queries, and receives and processes incoming queries;

providing, by the BI server, a user interface;

displaying, at the user interface, a dataset selector comprising a dataset canvas, the dataset selector providing a drag and drop interface allowing a user to drag a plurality of datasets onto the dataset canvas, wherein each dataset comprises data tables;

receiving, via the user interface, an instruction comprising an instruction to mark a plurality of the data tables at the dataset canvas as a plurality of hub tables and an instruction to mark another plurality of the data tables at the dataset canvas as a plurality of dimension tables;

marking the plurality of the data tables as hub tables and the another plurality of the data tables as dimension tables;

receiving, via the user interface, a further instruction specifying a plurality of joins to be performed between specific ones of the plurality of hub tables and specific ones of the plurality of dimension tables, the specific ones of the plurality of hub tables and the specific ones of the plurality of dimension tables being specified within the further instruction, the specified plurality of joins comprising an instruction to join a first hub table with two or more of the plurality of dimension table and another instruction to join a second hub table with one or more of the plurality of hub tables;

defining, based upon the joins between the plurality of hub tables and the plurality of dimension tables, a multi-hub dataset, the multi-hub dataset comprising metadata indicative of the joins between the plurality of hub tables and the plurality of dimension tables;

upon receiving a query for metrics directed to the multi-hub dataset, constructing a query plan based upon the received query for metrics; and running the constructed query plan to provide a response to the query by stitching together via a full outer join at least two of the plurality of hub tables together with their respective joins.

9. The method of claim 8, wherein a user can create a data set that uses tables from different connections, wherein the system uses relationships defined between the tables to create joins in the data set, for use in providing data analytics or visualizations.

10. The method of claim 8, wherein a user defines one or more join types and/or join columns for use with the multi-hub dataset; wherein in response to a query directed to the multi-hub dataset, the system determines an execution plan for the query shape, and accesses data sources and returns a result or dataset in response to the query.

11. The method of claim 8, wherein upon receiving the instruction to mark a plurality of the data tables as hub tables, said marking of the plurality of hub tables is persisted in metadata.

12. The method of claim 8, wherein the system is provided within a cloud environment.

13. The method of claim 8, wherein, upon receiving the query for metrics, the query for metrics is determined to be directed to a subset of the plurality of hub tables;

wherein the constructed query plan prunes all of the plurality of hub tables except the subset of the plurality of hub tables to which the query for metrics is directed to; and wherein only the subset of the plurality of hub tables are stitched together to provide a response to the query.

14. A non-transitory computer readable storage medium having instructions thereon, which when read and executed by a computer including one or more processors cause the computer to perform a method comprising:

providing, at one or more computers having a processor, memory, for use with a data analytics environment, a business intelligence (BI) server that describes data available as subject areas for queries, and receives and processes incoming queries;

providing, by the BI server, a user interface;

displaying, at the user interface, a dataset selector comprising a dataset canvas, the dataset selector providing a drag and drop interface allowing a user to drag a plurality of datasets onto the dataset canvas, wherein each dataset comprises data tables;

receiving, via the user interface, an instruction comprising an instruction to mark a plurality of the data tables at the dataset canvas as a plurality of hub tables and an instruction to mark another plurality of the data tables at the dataset canvas as a plurality of dimension tables;

marking the plurality of the data tables as hub tables and the another plurality of the data tables as dimension tables;

receiving, via the user interface, a further instruction specifying a plurality of joins to be performed between specific ones of the plurality of hub tables and specific ones of the plurality of dimension tables, the specific ones of the plurality of hub tables and the specific ones of the plurality of dimension tables being specified within the further instruction, the specified plurality of joins comprising an instruction to join a first hub table with two or more of the plurality of dimension table and another instruction to join a second hub table with one or more of the plurality of hub tables;

defining, based upon the joins between the plurality of hub tables and the plurality of dimension tables, a multi-hub dataset, the multi-hub dataset comprising metadata indicative of the joins between the plurality of hub tables and the plurality of dimension tables;

upon receiving a query for metrics directed to the multi-hub dataset, constructing a query plan based upon the received query for metrics; and running the constructed query plan to provide a response to the query by stitching together via a full outer join at least two of the plurality of hub tables together with their respective joins.

15. The non-transitory computer readable medium of claim 14, wherein a user can create a data set that uses tables from different connections, wherein the system uses relationships defined between the tables to create joins in the data set, for use in providing data analytics or visualizations.

16. The non-transitory computer readable medium of claim 14, wherein a user defines one or more join types and/or join columns for use with the multi-hub dataset; wherein in response to a query directed to the multi-hub dataset, the system determines an execution plan for the query shape, and accesses data sources and returns a result or dataset in response to the query.

17. The non-transitory computer readable medium of claim 14, wherein upon receiving the instruction to mark a plurality of the data tables as hub tables, said marking of the plurality of hub tables is persisted in metadata.

18. The non-transitory computer readable medium of claim 14, wherein the system is provided within a cloud environment.

19. The non-transitory computer readable storage medium of claim 14, wherein, upon receiving the query for metrics, the query for metrics is determined to be directed to a subset of the plurality of hub tables;

wherein the constructed query plan prunes all of the plurality of hub tables except the subset of the plurality of hub tables to which the query for metrics is directed to; and wherein only the subset of the plurality of hub tables are stitched together to provide a response to the query.

\* \* \* \* \*